US009115222B2

(12) United States Patent
Kitano et al.

(10) Patent No.: US 9,115,222 B2
(45) Date of Patent: Aug. 25, 2015

(54) WELL DEFINED, HIGHLY CROSSLINKED NANOPARTICLES AND METHOD FOR MAKING SAME

(75) Inventors: Hideki Kitano, Tokyo (JP); Yaohong Chen, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 610 days.

(21) Appl. No.: 12/979,719

(22) Filed: Dec. 28, 2010

(65) Prior Publication Data

US 2011/0236686 A1 Sep. 29, 2011

Related U.S. Application Data

(60) Provisional application No. 61/290,755, filed on Dec. 29, 2009.

(51) Int. Cl.
    C08F 2/00 (2006.01)
    C08F 2/06 (2006.01)
    B01J 13/18 (2006.01)

(52) U.S. Cl.
    CPC . *C08F 2/06* (2013.01); *B01J 13/18* (2013.01); *C08F 2800/20* (2013.01); *C08F 2810/20* (2013.01); *Y10T 428/2982* (2015.01)

(58) Field of Classification Search
    USPC .............. 525/193, 50, 55, 242–386, 89, 204, 525/209; 977/773, 897; 156/110
    See application file for complete search history.

(56) References Cited

U.S. PATENT DOCUMENTS

| 2,531,396 | A | 11/1950 | Carter et al. |
| 3,177,186 | A | 4/1965 | Miller |
| 3,598,884 | A | 8/1971 | Wei et al. |
| 3,793,402 | A | 2/1974 | Owens |
| 3,840,620 | A | 10/1974 | Gallagher |
| 3,927,143 | A | 12/1975 | Makowski et al. |
| 3,972,963 | A | 8/1976 | Schwab et al. |
| 4,075,186 | A | 2/1978 | Ambrose et al. |
| 4,233,409 | A | 11/1980 | Bulkley |
| 4,247,434 | A | 1/1981 | Vanderhoff et al. |
| 4,248,986 | A | 2/1981 | Lai et al. |
| 4,326,008 | A | 4/1982 | Rembaum |
| 4,386,125 | A | 5/1983 | Shiraki et al. |
| 4,408,018 | A | 10/1983 | Bartman et al. |
| 4,417,029 | A | 11/1983 | Milkovich |
| 4,463,129 | A | 7/1984 | Shinada et al. |
| 4,471,093 | A | 9/1984 | Furukawa et al. |
| 4,543,403 | A | 9/1985 | Isayama et al. |
| 4,598,105 | A | 7/1986 | Weber et al. |
| 4,600,749 | A | 7/1986 | Minekawa et al. |
| 4,602,052 | A | 7/1986 | Weber et al. |
| 4,617,346 | A | 10/1986 | Sonoda |
| 4,659,782 | A | 4/1987 | Spinelli |
| 4,659,790 | A | 4/1987 | Shimozato et al. |
| 4,717,655 | A | 1/1988 | Fulwyler |
| 4,722,770 | A | 2/1988 | Blottiere et al. |
| 4,725,522 | A | 2/1988 | Breton et al. |
| 4,764,572 | A | 8/1988 | Bean, Jr. |
| 4,773,521 | A | 9/1988 | Chen |
| 4,774,189 | A | 9/1988 | Schwartz |
| 4,788,254 | A | 11/1988 | Kawakubo et al. |
| 4,798,691 | A | 1/1989 | Kasai et al. |
| 4,829,130 | A | 5/1989 | Licchelli et al. |
| 4,829,135 | A | 5/1989 | Gunesin et al. |
| 4,837,274 | A | 6/1989 | Kawakubo et al. |
| 4,837,401 | A | 6/1989 | Hirose et al. |
| 4,861,131 | A | 8/1989 | Bois et al. |
| 4,870,144 | A | 9/1989 | Noda et al. |
| 4,871,814 | A | 10/1989 | Gunesin et al. |
| 4,904,730 | A | 2/1990 | Moore et al. |
| 4,904,732 | A | 2/1990 | Iwahara et al. |
| 4,906,695 | A | 3/1990 | Blizzard et al. |
| 4,920,160 | A | 4/1990 | Chip et al. |
| 4,942,209 | A | 7/1990 | Gunesin |
| 4,987,202 | A | 1/1991 | Zeigler |
| 5,036,138 | A | 7/1991 | Stamhuis et al. |

(Continued)

FOREIGN PATENT DOCUMENTS

| CA | 2127919 | 3/1995 |
| CN | 1560094 A | 1/2005 |

(Continued)

OTHER PUBLICATIONS

Awan et al., Anionic dispersion polymerization of Styrene, J. polymer science: part A polymer chemistry, vol. 34, 2633-2649 (1996).*
Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).
Alexandridis, Paschalis et al., "Amphiphilic Block Copolymers: Self-Assembly and Applications", Elsevier Science B.V., pp. 1-435 (2000).

(Continued)

*Primary Examiner* — Monique Peets
(74) *Attorney, Agent, or Firm* — Meredith E. Hooker; Nathan T. Lewis

(57) ABSTRACT

A method is provided for making nanoparticles, including the steps of: combining a hydrocarbon solvent and an aprotic, polar co-solvent, a mono-vinyl aromatic monomer, polymerization initiator, a solution stabilizer, and a first charge of a cross-linking agent. Subsequently, a second charge of cross-linking agent is added. The nanoparticles have an average diameter of 5 nanometers to about 10,000 nanometers. Spherical nanoparticles are also provided that include a cross-linking agent comprising 30% to 60% by weight of the combined weight of a mono-vinyl aromatic species and the cross-linking agent. The spherical nanoparticles also meet the following equation:

$$0.90 \leq (D1/D2) \leq 1.1$$

wherein D1 is a first diameter of a nanoparticle and D2 is a second diameter of the nanoparticle, and D1 and D2 intersect at right angles.

23 Claims, 7 Drawing Sheets

(56) References Cited

U.S. PATENT DOCUMENTS

| | | |
|---|---|---|
| 5,066,729 A | 11/1991 | Stayer, Jr. et al. |
| 5,073,498 A | 12/1991 | Schwartz et al. |
| 5,075,377 A | 12/1991 | Kawabuchi et al. |
| 5,120,379 A | 6/1992 | Noda et al. |
| 5,130,377 A | 7/1992 | Trepka et al. |
| 5,169,914 A | 12/1992 | Kaszas et al. |
| 5,183,851 A | 2/1993 | Visani et al. |
| 5,194,300 A | 3/1993 | Cheung |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,296,547 A | 3/1994 | Nestegard et al. |
| 5,298,559 A | 3/1994 | Fujii et al. |
| 5,329,005 A | 7/1994 | Lawson et al. |
| 5,331,035 A | 7/1994 | Hall |
| 5,336,712 A | 8/1994 | Austgen, Jr. et al. |
| 5,362,794 A | 11/1994 | Inui et al. |
| 5,395,891 A | 3/1995 | Obrecht et al. |
| 5,395,902 A | 3/1995 | Hall |
| 5,399,628 A | 3/1995 | Moczygemba et al. |
| 5,399,629 A | 3/1995 | Coolbaugh et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |
| 5,514,734 A | 5/1996 | Maxfield et al. |
| 5,514,753 A | 5/1996 | Ozawa et al. |
| 5,521,309 A | 5/1996 | Antkowiak et al. |
| 5,525,639 A | 6/1996 | Keneko et al. |
| 5,527,870 A | 6/1996 | Maeda et al. |
| 5,530,052 A | 6/1996 | Takekoshi et al. |
| 5,534,592 A | 7/1996 | Halasa et al. |
| 5,580,925 A | 12/1996 | Iwahara et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,627,252 A | 5/1997 | De La Croi Habimana |
| 5,674,592 A | 10/1997 | Clark et al. |
| 5,686,528 A | 11/1997 | Wills et al. |
| 5,688,856 A | 11/1997 | Austgen, Jr. et al. |
| 5,700,897 A | 12/1997 | Klainer et al. |
| 5,707,439 A | 1/1998 | Takekoshi et al. |
| 5,728,791 A | 3/1998 | Tamai et al. |
| 5,733,975 A | 3/1998 | Aoyama et al. |
| 5,739,267 A | 4/1998 | Fujisawa et al. |
| 5,742,118 A | 4/1998 | Endo et al. |
| 5,747,152 A | 5/1998 | Oka et al. |
| 5,763,551 A | 6/1998 | Wunsch et al. |
| 5,773,521 A | 6/1998 | Hoxmeier et al. |
| 5,777,037 A | 7/1998 | Yamanaka et al. |
| 5,811,501 A | 9/1998 | Chiba et al. |
| 5,834,563 A | 11/1998 | Kimura et al. |
| 5,847,054 A | 12/1998 | McKee et al. |
| 5,849,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,897,811 A | 4/1999 | Lesko |
| 5,905,116 A | 5/1999 | Wang et al. |
| 5,910,530 A | 6/1999 | Wang et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,020,446 A | 2/2000 | Okamoto et al. |
| 6,025,416 A | 2/2000 | Proebster et al. |
| 6,025,445 A | 2/2000 | Chiba et al. |
| 6,060,549 A | 5/2000 | Li et al. |
| 6,060,559 A | 5/2000 | Feng et al. |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,127,488 A | 10/2000 | Obrecht et al. |
| 6,147,151 A | 11/2000 | Fukumoto et al. |
| 6,166,855 A | 12/2000 | Ikeyama et al. |
| 6,180,693 B1 | 1/2001 | Tang et al. |
| 6,191,217 B1 | 2/2001 | Wang et al. |
| 6,197,849 B1 | 3/2001 | Zilg et al. |
| 6,204,354 B1 | 3/2001 | Wang et al. |
| 6,207,263 B1 | 3/2001 | Takematsu et al. |
| 6,225,394 B1 | 5/2001 | Lan et al. |
| 6,252,014 B1 | 6/2001 | Knauss |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B2 | 2/2002 | Hiiro et al. |
| 6,359,075 B1 | 3/2002 | Wollum et al. |
| 6,379,791 B1 | 4/2002 | Cernohous et al. |
| 6,383,500 B1 | 5/2002 | Wooley et al. |
| 6,395,829 B1 | 5/2002 | Miyamoto et al. |
| 6,420,486 B1 | 7/2002 | DePorter et al. |
| 6,437,050 B1 | 8/2002 | Krom et al. |
| 6,441,090 B1 | 8/2002 | Demirors et al. |
| 6,448,353 B1 | 9/2002 | Nelson et al. |
| 6,489,378 B1 | 12/2002 | Sosa et al. |
| 6,506,567 B2 | 1/2003 | Makino et al. |
| 6,524,595 B1 | 2/2003 | Perrier et al. |
| 6,573,313 B2 | 6/2003 | Li et al. |
| 6,573,330 B1 | 6/2003 | Fujikake et al. |
| 6,598,645 B1 | 7/2003 | Larson |
| 6,649,702 B1 | 11/2003 | Rapoport et al. |
| 6,663,960 B1 | 12/2003 | Murakami et al. |
| 6,689,469 B2 | 2/2004 | Wang et al. |
| 6,693,746 B1 | 2/2004 | Nakamura et al. |
| 6,706,813 B2 | 3/2004 | Chiba et al. |
| 6,706,823 B2 | 3/2004 | Wang et al. |
| 6,727,307 B2 | 4/2004 | Kondo et al. |
| 6,727,311 B2 | 4/2004 | Ajbani et al. |
| 6,737,486 B2 | 5/2004 | Wang |
| 6,750,297 B2 | 6/2004 | Yeu et al. |
| 6,759,464 B2 | 7/2004 | Ajbani et al. |
| 6,774,185 B2 | 8/2004 | Lin et al. |
| 6,777,500 B2 | 8/2004 | Lean et al. |
| 6,780,937 B2 | 8/2004 | Castner |
| 6,835,781 B2 | 12/2004 | Kondou et al. |
| 6,858,665 B2 | 2/2005 | Larson |
| 6,861,462 B2 | 3/2005 | Parker et al. |
| 6,872,785 B2 | 3/2005 | Wang et al. |
| 6,875,818 B2 | 4/2005 | Wang |
| 6,908,958 B2 | 6/2005 | Maruyama et al. |
| 6,956,084 B2 | 10/2005 | Wang et al. |
| 7,056,840 B2 | 6/2006 | Miller et al. |
| 7,067,199 B2 | 6/2006 | Hattori et al. |
| 7,071,246 B2 | 7/2006 | Xie et al. |
| 7,112,369 B2 | 9/2006 | Wang et al. |
| 7,179,864 B2 | 2/2007 | Wang |
| 7,193,004 B2 | 3/2007 | Weydert et al. |
| 7,205,370 B2 | 4/2007 | Wang et al. |
| 7,217,775 B2 | 5/2007 | Castner |
| 7,238,751 B2 | 7/2007 | Wang et al. |
| 7,244,783 B2 | 7/2007 | Lean et al. |
| 7,291,394 B2 | 11/2007 | Winkler et al. |
| 7,347,237 B2 | 3/2008 | Xie et al. |
| 7,408,005 B2 | 8/2008 | Zheng et al. |
| 7,538,159 B2 | 5/2009 | Wang et al. |
| 7,544,740 B2 | 6/2009 | Wang et al. |
| 7,553,909 B2 | 6/2009 | Wang et al. |
| 7,560,510 B2 | 7/2009 | Wang et al. |
| 7,597,959 B2 | 10/2009 | Wang et al. |
| 7,649,049 B2 | 1/2010 | Kleckner et al. |
| 7,659,342 B2 | 2/2010 | Wang et al. |
| 7,695,813 B2 | 4/2010 | Schultes et al. |
| 7,718,737 B2 | 5/2010 | Wang et al. |

(56) References Cited

U.S. PATENT DOCUMENTS

| | | |
|---|---|---|
| 7,718,738 B2 | 5/2010 | Wang et al. |
| 7,786,236 B2 | 8/2010 | Wang et al. |
| 7,795,344 B2 | 9/2010 | Wang et al. |
| 7,820,771 B2 | 10/2010 | Lapra et al. |
| 7,829,624 B2 | 11/2010 | Warren |
| 7,884,160 B2 | 2/2011 | Wang et al. |
| 7,897,690 B2 | 3/2011 | Wang et al. |
| 8,063,142 B2 | 11/2011 | Wang et al. |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2002/0095008 A1 | 7/2002 | Heinrich et al. |
| 2002/0144401 A1 | 10/2002 | Nogueroles Vines et al. |
| 2003/0004250 A1 | 1/2003 | Ajbani et al. |
| 2003/0032710 A1 | 2/2003 | Larson |
| 2003/0124353 A1 | 7/2003 | Wang et al. |
| 2003/0130401 A1 | 7/2003 | Lin et al. |
| 2003/0149185 A1 | 8/2003 | Wang et al. |
| 2003/0198810 A1 | 10/2003 | Wang et al. |
| 2003/0225190 A1 | 12/2003 | Borbely et al. |
| 2004/0033345 A1 | 2/2004 | Dubertret et al. |
| 2004/0059057 A1 | 3/2004 | Swisher et al. |
| 2004/0091546 A1 | 5/2004 | Johnson et al. |
| 2004/0127603 A1 | 7/2004 | Lean et al. |
| 2004/0143064 A1 | 7/2004 | Wang |
| 2004/0198917 A1 | 10/2004 | Castner |
| 2004/0202881 A1 | 10/2004 | Everaerts et al. |
| 2005/0101743 A1 | 5/2005 | Stacy et al. |
| 2005/0122819 A1 | 6/2005 | Park et al. |
| 2005/0182158 A1 | 8/2005 | Ziser et al. |
| 2005/0192408 A1 | 9/2005 | Lin et al. |
| 2005/0197462 A1 | 9/2005 | Wang et al. |
| 2005/0203248 A1 | 9/2005 | Zheng et al. |
| 2005/0215693 A1 | 9/2005 | Wang et al. |
| 2005/0220750 A1 | 10/2005 | Robert et al. |
| 2005/0220890 A1 | 10/2005 | Charmot et al. |
| 2005/0228072 A1 | 10/2005 | Winkler et al. |
| 2005/0228074 A1 | 10/2005 | Wang et al. |
| 2005/0282956 A1 | 12/2005 | Bohm et al. |
| 2005/0288393 A1 | 12/2005 | Lean et al. |
| 2006/0084722 A1 | 4/2006 | Lin et al. |
| 2006/0116473 A1 | 6/2006 | Castner et al. |
| 2006/0147714 A1 | 7/2006 | Schultes et al. |
| 2006/0173115 A1 | 8/2006 | Wang et al. |
| 2006/0173130 A1 | 8/2006 | Wang et al. |
| 2006/0235128 A1 | 10/2006 | Wang et al. |
| 2006/0280798 A1 | 12/2006 | Ensoli |
| 2007/0027264 A1 | 2/2007 | Wang et al. |
| 2007/0081830 A1 | 4/2007 | Bender et al. |
| 2007/0135579 A1 | 6/2007 | Obrecht et al. |
| 2007/0142550 A1 | 6/2007 | Wang et al. |
| 2007/0142559 A1 | 6/2007 | Wang et al. |
| 2007/0149649 A1 | 6/2007 | Wang et al. |
| 2007/0149652 A1 | 6/2007 | Yoon et al. |
| 2007/0161754 A1 | 7/2007 | Bohm et al. |
| 2007/0181302 A1 | 8/2007 | Bicerano |
| 2007/0185273 A1 | 8/2007 | Hall et al. |
| 2007/0196653 A1 | 8/2007 | Hall et al. |
| 2008/0001116 A1 | 1/2008 | Fredrickson et al. |
| 2008/0145660 A1 | 6/2008 | Wang et al. |
| 2008/0149238 A1 | 6/2008 | Kleckner et al. |
| 2008/0160305 A1 | 7/2008 | Wang et al. |
| 2008/0171272 A1 | 7/2008 | Nakashima et al. |
| 2008/0188579 A1 | 8/2008 | Wang et al. |
| 2008/0242813 A1 | 10/2008 | Zheng et al. |
| 2008/0286374 A1 | 11/2008 | Wang et al. |
| 2008/0305336 A1 | 12/2008 | Wang et al. |
| 2009/0005491 A1* | 1/2009 | Warren ........................ 524/496 |
| 2009/0048390 A1 | 2/2009 | Wang et al. |
| 2009/0054554 A1 | 2/2009 | Wang et al. |
| 2009/0270558 A1 | 10/2009 | Gandon-Pain et al. |
| 2009/0306246 A1 | 12/2009 | Gervat et al. |
| 2010/0004398 A1* | 1/2010 | Wang et al. ................... 525/193 |
| 2010/0016472 A1 | 1/2010 | Wang et al. |
| 2010/0016512 A1 | 1/2010 | Wang et al. |
| 2010/0324167 A1 | 12/2010 | Wang et al. |
| 2011/0021702 A1 | 1/2011 | Gandon-Pain et al. |
| 2011/0024011 A1 | 2/2011 | Castner et al. |
| 2011/0172364 A1 | 7/2011 | Yaohong et al. |
| 2011/0213066 A1 | 9/2011 | Wang et al. |
| 2011/0236686 A1 | 9/2011 | Kitano et al. |
| 2012/0132346 A1* | 5/2012 | Chen et al. .................. 156/110.1 |

FOREIGN PATENT DOCUMENTS

| | | |
|---|---|---|
| DE | 3434983 | 4/1986 |
| DE | 3735403 | 5/1989 |
| DE | 4241538 | 6/1994 |
| EP | 0143500 | 6/1985 |
| EP | 0255170 | 2/1988 |
| EP | 0265142 | 4/1988 |
| EP | 0322905 | 7/1989 |
| EP | 0352042 | 1/1990 |
| EP | 0472344 | 2/1992 |
| EP | 0540942 | 5/1993 |
| EP | 0590491 | 4/1994 |
| EP | 0742268 | 11/1996 |
| EP | 1031605 | 8/2000 |
| EP | 1099728 | 5/2001 |
| EP | 1134251 | 9/2001 |
| EP | 1273616 | 1/2003 |
| EP | 1321489 | 6/2003 |
| EP | 1783168 | 5/2007 |
| JP | 70002106 B | 1/1970 |
| JP | 1279943 | 1/1989 |
| JP | 2191619 | 7/1990 |
| JP | 2196893 | 8/1990 |
| JP | 05132605 | 5/1993 |
| JP | 06-093057 A | 4/1994 |
| JP | 06248017 | 9/1994 |
| JP | 7011043 | 1/1995 |
| JP | 8199062 | 8/1996 |
| JP | 2000-517491 | 11/2000 |
| JP | 2003-095640 | 4/2003 |
| JP | 2005-537341 A | 12/2005 |
| JP | 2006-072283 | 3/2006 |
| JP | 2006-106596 | 4/2006 |
| JP | 2007-304409 | 11/2007 |
| JP | 2008-069346 | 3/2008 |
| KR | 10-2008-0057319 | 6/2008 |
| RU | 2184125 | 6/2002 |
| SU | 465010 | 11/1975 |
| WO | 9104992 | 7/1991 |
| WO | 9704029 | 2/1997 |
| WO | 9853000 | 11/1998 |
| WO | 0075226 | 12/2000 |
| WO | 0187999 | 11/2001 |
| WO | 0202472 | 1/2002 |
| WO | 0241987 | 5/2002 |
| WO | 0244290 A2 | 6/2002 |
| WO | 02031002 | 7/2002 |
| WO | 02081233 | 10/2002 |
| WO | 02100936 | 12/2002 |
| WO | 03032061 | 4/2003 |
| WO | 03085040 | 10/2003 |
| WO | 03106557 | 12/2003 |
| WO | 2004/058874 | 7/2004 |
| WO | 2006/069793 | 7/2006 |
| WO | 2008/014464 | 1/2008 |
| WO | 2008/079276 | 7/2008 |
| WO | 2008/079807 | 7/2008 |
| WO | 2009/006434 | 1/2009 |

OTHER PUBLICATIONS

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

(56) References Cited

OTHER PUBLICATIONS

Bahadur, Pratap, "Block copolymers- Their microdomain formation (in solid state) and surfactant behaviour (in solution)", Current Science, vol. 80, No. 8, pp. 1002-1007 (Apr. 25, 2001).

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Bohm, Georg et al., "Emerging materials: technology for new tires and other rubber products", Tire Technology International, 4 pp. (2006).

Borukhov, hamar et al., "Enthalpic Stabilization of Brush-Coated Particles in a Polymer Melt", Macromolecules, vol. 35, pp. 5171-5182 (2002).

Bradley, John S., "The Chemistry of Transition Metal Colloids", Clusters and Colloids: From Theory to Applications, Chapter 6, Weinheim, VCH, pp. 459-544 (1994).

Bradley, Melanie et al., "Poly(vinylpyridine) Core/Poly(N-isoproplacrylamide) Shell Microgel Particles: Their Characterization and the Uptake and Release of an Anionic Surfactant", Langmuir, vol. 24, pp. 2421-2425 (Mar. 14, 2008).

Braun, Hartmut et al., "Enthalpic interaction of diblock copolymers with immiscible polymer blend components", Polymer Bulletin, vol. 32, pp. 241-248 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99 (Jan. 1, 1965).

Calderara, Frederic et al., "Synthesis of chromophore-labelled polystyrene/poly(ethylene oxide) diblock copolymers", Makromol. Chem., 194, pp. 1411-1420 (1993).

Canham et al., "Formation of Worm-like Micelles from a Polystyrene-Polybutadiene-Polystyrene Block Copolymer in Ethyl Acetate", J.C.S. Faraday 1, 76, pp. 1857-1867 (1980).

Chen, Ming-Qing et al., "Graft Copolymers Having Hydrophobic Backbone and Hydrophilic Branches. XXIII. Particle Size Control of Poly(ethylene glycol)-Coated Polystyrene Nanoparticles Prepared by Macromonomer Method", Journal of Polymer Science: Part A: Polymer Chemistry, vol. 37, pp. 2155-2166 (1999).

Chen, Wei et al., "Ultrahydrophobic and Ultrayophobic Surfaces: Some Comments and Examples", The ACS Journal of Surfaces and Colloids, vol. 15, No. 10, pp. 3395-3399 (May 11, 1999).

Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).

Coleman, Lester E. et al., "Reaction of Primary Aliphatic Amines with Maleic Anhydride", J. Org,. Chem., 24, 185, pp. 135-136 (1959).

Cosgrove, T . et al., "Adsorbed Block Copolymer of Poly(2-vinylpyridine) and Polystyrene Studied by Neutron Reflectivity and Surface Force Techniques", Macromolecules, 26, pp. 4363-4367 (1993).

Coulson, S.R. et al., "Super-Repellent Composite Fluoropolymer Surfaces", The Journal of Physical Chemistry B, vol. 104, No. 37, pp. 8836-8840 (Sep. 21, 2000).

Cui, Honggang et al., "Block Copolymer Assembly via Kinetic Control", Science, vol. 317, pp. 647-650 (Aug. 3, 2007).

Dieterich, W. et al., "Non-Debye Relaxations in Disordered Ionic Solids", Chem. Chys., 284, pp. 439-467 (2002).

Edmonds, William F. et al., "Disk Micelles from Nonionic Coil- Coil Diblock Copolymers", Macromolecules, vol. 39, pp. 4526-4530 (May 28, 2006).

Ege, Seyhan, Organic Chemistry Structure and Reactivity, 3rd Edition, p. 959 (1994).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erbil, H. Yildirim et al., "Transformation of a Simple Plastic into a Superhydrophobic Surface", Science, vol. 299, pp. 1377-1380 (Feb. 28, 2003).

Erhardt, Rainer et al., "Janus Micelles", Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Ferreira, Paula G. et al., "Scaling Law for Entropic Effects at Interfaces between Grafted Layers and Polymer Melts", Macromolecules, vol. 31, pp. 3994-4003 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Gay, C., "Wetting of a Polymer Brush by a Chemically Identical Polymer Melt", Macromolecules, vol. 30, pp. 5939-5943 (1997).

Giannelis, E.P. "Polymer Layered Silicate Nanocomposites", Advanced Materials, vol. 8, No. 1, pp. 29-35 (Jan. 1, 1996).

Gilman, J.W. et al., "Recent Advances in Flame Retardant Polymer Nanocomposites", pp. 273-283.

Greenwood, N.N. et al., "Chemistry of the Elements", Pergaroen Press, New York, pp. 1126-1127 (1984).

Guo, Andrew et al., "Star Polymers and Nanospheres from Cross-Linkable Diblock Copolymers", Macromolecules, vol. 29, pp. 2487-2493 (Jan. 17, 1996).

Halperin, A., "Polymeric Micelles: A Star Model", Macromolecules, vol. 20, pp. 2943-2946 (1987).

Hamley, Ian W., "The Physics of Block Copolymers", Oxford Science Publication: Oxford, Chapters 3 and 4, pp. 131-265, (1998).

Hardacre, C. et al., "Structure of molten 1,3-dimethylimidazolium chloride using neutron diffraction", J. Chem. Physics, 118(1), pp. 273-278 (2003).

Hasegawa, Ryuichi et al., "Optimum Graft Density for Dispersing Particles in Polymer Melts", Macromolecules, vol. 29, pp. 6656-6662 (1996).

Haeussler, L. et al., "Simultaneous TA and MS Analysis of Alternating Styrene-Malei Anhydride and Styrene-Maleimide Copolymers", Thermochim. Acta, 277, 14 (1996).

Hay, J.N. et al., "A Review of Nanocomposites", 15 pp. (2000).

Hoffman, B. et al., "Rheology of Nanocomposites Based on Layered Silicates and Polyamide-12", Colloid Polm. Sci.., 278, pp. 629-636 (2000).

Ishizu, Koji et al., "Synthesis of Star Polymer with Nucleus of Microgel", Polymer Journal, vol. 12, No. 6, pp. 399-404 (1980).

Ishizu, Koji et al., "Core-Shell Type Polymer Microspheres Prepared from Block Copolymers", Journal of Polymer Science: Part C: Polymer Letters, vol. 26, pp. 281-286 (1988).

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

Ishizu, Koji et al., "Preparation of core-shell type polymer microspheres from anionic block copolymers", Polymer, vol. 34, No. 18, pp. 3929-3933 (1993).

Ishizu, Koji, "Synthesis and Structural Ordering of Core-Shell Polymer Microspheres", Prog. Polym. Sci., vol. 23, pp. 1383-1408 (1998).

Ishizu, Koji, "Star Polymers by Immobilizing Functional Block Copolymers", Star and Hyperbranched Polymers, ISBN 0/8247, pp. 1986-1987 (1999).

(56) References Cited

OTHER PUBLICATIONS

Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).
Jensen, M. et al., "EXAFS Investigations of the Mechanism of Facilitated Ion Transfer into a Room-Temperature Ionic Liquid", Jacs, 124, pp. 10664-10665 (2002).
Kim, Woo-Sik et al., "Synthesis and Photocrosslinking of Maleimide-Type Polymers", Macromol. Rapid Commun., 17, 835, pp. 835-841 (1996).
Kralik, M. et al., "Catalysis by metal nanoparticles supported on functional organic polymers", Journal of Molecular Catalysis A: Chemical, vol. 177, pp. 113-138 (2001).
Kraus, Gerard, "Mechanical Losses in Carbon-Black-Filled Rubbers", Journal of Applied Polymer Science: Applied Polymer Symposium, vol. 39, pp. 75-92 (1984).
Krishnamoorti, R. et al., "Rheology of End-Tethered Polymer Layered Silicate Nanocomposites", Macromol., 30, pp. 4097-4102 (1997).
Lagaly, Gehard, "Kink-Block and Gauche-Block Structures of Bimolecular Films", Chem. Int. Ed. Engl., vol. 15, No. 10, pp. 575-586 (1976).
Lawson, David F. et al., "Preparation and Characterization of Heterophase Blends of Polycaprolactam and Hydrogenated Polydienes", Central Research Journal of Applied Polymer Science, vol. 39, pp. 2331-2351 (1990).
Lee, Wen-Fu et al., "Polysulfobetaines and Corresponding Cationic Polymers. IV. Synthesis and Aqueous Solution Properties of Cationic Poly (MIQSDMAPM)", J. Appl. Pol. Sci., vol. 59, pp. 599-608 (1996).
Ligoure, Christian, "Adhesion between a Polymer Brush and an Elastomer: A Self-Consistent Mean Field Model", Macromolecules, vol. 29, pp. 5459-5468 (1996).
Liu, Guojun et al., "Diblock Copolymer Nanofibers", Macromolecules, 29, pp. 5508-5510 (1996).
Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).
Ma, H. et al., "Reverse Atom Transfer Radical Polymerization of Methyl Methacrylate in Room-Temperature Inoic Liqquids", J. Polym. Sci., A. Polym. Chem., 41, pp. 143-151 (2003).
Ma, Qinggao et al., "Entirely Hydrophilic Shell Cross-Linked Knedel-Like (SCK) Nanoparticles", Polymer Preprints, vol. 41, No. 2, pp. 1571-1572 (2000).
Mandema et al., "Association of Block Copolymers in Selective Solvents, I Measurements on Hydrogenated Poly(styrene-isoprene) in Decane and in trans-Decalin", Makromol. Chem. 180, pp. 1521-1538 (1979).
Matsen, M.W., "Phase Behavior of Block Copolymer/Homopolymer Blends", Macromolecules, vol. 28, pp. 5765-5773 (1995).
Matsumoto, A. et al., "Synthesis, Thermal Properties and Gas Permeability of Poly (N-n-alkylmaleimide)s", Polymer Journal, vol. 23, No. 3, pp. 201-209 (1991).
Mayer, A.B.R. et al., "Transition metal nanoparticles protected by amphiphilic block copolymers as tailored catalyst systems", Colloid Polym. Sci., 275, pp. 333-340 (1997).
Mendizabal, E. et al., "Functionalized Core-Shell Polymers Prepared by Microemulsion Polymerization", ANTEC 1997 Plastics: Plastics Saving Planet Earth, vol. 2: Materials Conference Proceedings, pp. 1733-1737.
Mi, Yongli et al., "Glass transition of nano-sized single chain globules", Polymer 43, Elsevier Science Ltd., pp. 6701-6705 (2002).
Milner, S.T. et al., "Theory of the Grafted Polymer Brush", Macromolecules, vol. 21, pp. 2610-2619 (1988).
Milner, S.T. et al., "End-Confined Polymers: Corrections to the Newtonian Limit", Macromolecules, vol. 22, pp. 489-490 (1989).
Moller, Martin et al., "Mineralization of Gold in Block Copolymer Micelles", Macromol. Symp., 117, pp. 207-218 (1997).
Mossmer, Stefan et al., "Solution Behavior of Poly(styrene)-block-poly(2-vinylpyridine) Micelles Containing Gold Nanoparticles", Macromolecules, 33, pp. 4791-4798 (2000).
Nace, Vaughn M., "Nonionic Surfactants: Polyoxyalkylene Block Copolymers", Surfactant Science Series, vol. 60, pp. 1-266 (1996).
Newkome G.R, "Dendrimers and Dendrons, Concept, Synthesis, Application", pp. 45, 191-310 (2001).
Noolandi, Jaan et al., "Theory of Block Copolymer Micelles in Solution", Macromolecules, vol. 16, pp. 1443-1448 (1983).
O'Reilly, Rachel K. et al., "Functionalization of Micelles and Shell Cross-linked Nanoparticles Using Click Chemistry", Chem. Mater., vol. 17, No. 24, pp. 5976-5988 (Nov. 24, 2005).
O'Reilly, Rachel K. et al., "Cross-linked block copolymer micelles: functional nanostructures of great potential and versatility", Chem. Soc. Rev., vol. 35, pp. 1068-1083 (Oct. 2, 2006).
Okay, Oguz et al., "Steric stabilization of reactive microgels from 1,4-divinylbenzene", Makromol. Chem., Rapid Commun., vol. 11, pp. 583-587 (1990).
Okay, Oguz et al., "Anionic Dispersion Polymerization of 1,4-Divinylbenzene", Macromolecules, 23, pp. 2623-2628 (1990).
Oranli, Levent et al., "Hydrodynamic studies on micellar solutions of styrene-butadiene block copolymers in selective solvents", Can. J. Chem., vol. 63, pp. 2691-2696 (1985).
Piirma, Irja, "Polymeric Surfactants", Surfactant Science Series, vol. 42, pp. 1-289 (1992).
Pispas, S. et al., "Effect of Architecture on the Micellization Properties of Block Copolymers: $A_2B$ Miktoarm Stars vs AB Diblocks", Macromolecules, vol. 33, pp. 1741-1746 (Feb. 17, 2000).
Powers, P.O., "Solubility of Polystyrene Fractions in Hydrocarbons", Industrial and Engineering Chemistry, vol. 42, No. 12, pp. 2558-2562 (Dec. 1950).
Price, Colin, "Colloidal Properties of Block Copolymers", Applied Science Publishers Ltd., Chapter 2, pp. 39-80 (1982).
Quirk, Roderic P. et al., "Controlled Anionic Synthesis of Polyisoprene-Poly(2-vinylpyridine) Diblock Copolymers in Hydrocarbon Solution", Macromolecules, 34, pp. 1192-1197 (2001).
Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).
Rein, David H. et al., "Kinetics of arm-first star polymers formation in a non-polar solvent", Macromol. Chem. Phys., vol. 199, pp. 569-574 (1998).
Rempp, Paul et al., "Grafting and Branching of Polymers", Pure Appl. Chem., vol. 30, pp. 229-238 (1972).
Ren, J., "Linear Viscoelasticity of Disordered Polystyrene-Polyisoprene . . . Layered-Silicate Nanocomposites", Macromol., pp. 3739-3746 (2000).
Riess, Gerard et al., "Block Copolymers", Encyclopedia of Polymer Science and Engineering, vol. 2, pp. 324-434 (1985).
Riess, Gerard, "Micellization of block copolymers", Prog. Polym. Sci., vol. 28, pp. 1107-1170 (Jan. 16, 2003).
Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).
Saito, Reiko et al., "Synthesis of microspheres with 'hairy-ball' structures from poly (styrene-b-2-vinyl pyridine) diblock copolymers", Polymer, vol. 33, No. 5, pp. 1073-1077 (1992).
Saito, Reiko et al., "Arm-number effect of core-shell type polymer microsphere: 1. Control of arm-number of microsphere", Polymer, vol. 35, No. 4, pp. 866-871 (1994).
Saito, Reiko et al., "Synthesis of Microspheres with Microphase-Separated Shells", Journal of Polymer Science: Part A: Polymer Chemistry, vol. 38, pp. 2091-2097 (2000).
Sakurai, Ryo et al., "68.2: Color and Flexible Electronic Paper Display using QR-LPD Technology", SID 06 Digest, pp. 1922-1925 (2006).
Semenov, A.N., "Theory of Diblock-Copolymer Segregation to the Interface and Free Surface of a Homopolymer Layer", Macromolecules, vol. 25, pp. 4967-4977 (1992).
Semenov, A.N., "Phase Equilibria in Block Copolymer-Homopolymer Mixtures", Macromolecules, vol. 26, pp. 2273-2281 (1993).

(56) References Cited

OTHER PUBLICATIONS

Serizawa, Takeshi et al., "Transmission Electron Microscopic Study of Cross-Sectional Morphologies of Core-Corona Polymeric Nanospheres", Macromolecules, 33, pp. 1759-1764 (2000).
Shull, Kenneth R., "End-Adsorbed Polymer Brushes in High- and Low-Molecular-Weight Matrices", Macromolecules, vol. 29, pp. 2659-2666 (1996).
Simmons, Blake et al., "Templating Nanostructure trhough the Self-Assembly of Surfactants", Synthesis, Functionalization and Surface Treatment of Nanoparticles, ASP (Am.Sci.Pub.), pp. 51-52, 174-208 (2003).
Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).
Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).
Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).
Thurmond, K. Bruce et al., "Shell cross-linked polymer micelles: stabilized assemblies with great versatility and potential", Colloids and Surfaces B: Biointerfaces, vol. 16, pp. 45-54 (1999).
Tiyapiboonchaiya, C. et la., "Polymer-m-Ionic-Liquid Electrolytes", Micromol. Chem. Phys., 203, pp. 1906-1911 (2002).
Tomalia, Donald A. et al., Dendritic Macromolecules: Synthesis of Starburst Dendrimers, Macromolecules, vol. 19, No. 9, pp. 2466-2468 (1986).
Tsitsilianis, Constantinos et al., "Synthesis and characterization of hetero-arm star copolymers", Makromol. Chem. 191, pp. 2319-2328 (1990).
Tuzar et al ., "Anomalous Behaviour of Solutions of Styrene-Butadiene Block Copolymers in Some Solvents", Makromol. Chem. 178, pp. 22743-2746 (1977).
Tuzar, Zdenek et al., "Micelles of Block and Graft Copolymers in Solutions", Surface and Colloid Science, vol. 15, Chapter 1, pp. 1-83 (1993).
Utiyama et al., "Light-Scattering Studies of a Polystyrene-Poly(methyl methacrylate) Two-Blcok Copolymer in Mixed Solvents", Macromolecules, vol. 7, No. 4, pp. 515-520 (Jul.-Aug. 1974).
Vamvakaki, M. et al., "Synthesis of novel block and statistical methacrylate-based ionomers containing acidic, basic or betaine residues", Polymer, vol. 39, No. 11, pp. 2331-2337 (1998).
van der Maarel, J.R.C. et al., "Salt-Induced Contraction of Polyelectrolyte Diblock Copolymer Micelles", Langmuir, vol. 16, No. 19, pp. 7510-7519 (2000).
Vermeesch, I. et al., "Chemical Modification of Poly (styrene-co-maleic anhydride) with Primary N-Alkylamines by Reactive Extrusion", J. Applied Polym. Sci., vol. 53, pp. 1365-1373 (1994).
Wang, Xiaorong et al., "Chain conformation in two-dimensional dense state", Journal of Chemical Physics, vol. 121, No. 16, pp. 8158-8162 (Oct. 22, 2004).
Wang, Xiaorong et al., "Strain-induced nonlinearity of filled rubbers", Physical Review E 72, 031406, pp. 1-9 (Sep. 20, 2005).
Pre-print article, Wang, Xiaorong et al., "PMSE 392- Manufacture and Commercial Uses of Polymeric Nanoparticles", Division of Polymeric Materials: Science and Engineering (Mar. 2006).
Wang, Xiaorong et al., "Manufacture and Commercial Uses of Polymeric Nanoparticles", Polymeric Materials: Science and Engineering, vol. 94, p. 659 (2006).
Wang, Xr. et al., "Fluctuations and critical phenomena of a filled elastomer under deformation", Europhysics Letters, vol. 75, No. 4, pp. 590-596 (Aug. 15, 2006).
Wang, Xiaorong et al., "Under microscopes the poly(styrene/butadiene) nanoparticles", Journal of Electron Microscopy, vol. 56, No. 6, pp. 209-216 (2007).
Wang, Xiaorong et al., "Synthesis, Characterization, and Application of Novel Polymeric Nanoparticles", Macromolecules, 40, pp. 499-508 (2007).
Wang, Xiaorong et al., "Heterogeneity of structural relaxation in a particle-suspension system", EPL, 79, 18001, pp. 1-5 (Jul. 2007).
Wang, Xiaorong et al., "Dispersing hairy nanoparticles in polymer melts", Polmer, vol. 49, pp. 5683-5691 (Nov. 1, 2008).
Webber, Stephen E. et al., "Solvents and Self-Organization of Polymers", NATO ASI Series, Series E: Applied Sciences, vol. 327, pp. 1-509 (1996).
Whitmore, Mark Douglas et al., "Theory of Micelle Formation in Block Copolymer-Homopolymer Blends", Macromolecules, vol. 18, pp. 657-665 (1985).
Wijmans, C.M. et al., "Effect of Free Polymer on the Structure of a Polymer Brush and Interaction between Two Polymer Brushes", Macromolecules, vol. 27, pp. 3238-3248 (1994).
Wilkes, J.S. et al., "Dialkylimidazolium Chloroaluminate Melts: A New Class of Room-Temperature Ionic Liquids for Electrochemistry, Spectroscopy, and Synthesis", Inorg. Chem., 21, pp. 1263-1264 (1982).
Wilson, D.J. et al., "Photochemical Stabilization of Block Copolymer Micelles", Eur. Polym. J., vol. 24, No. 7, pp. 617-621 (1988).
Witten, T.A. et al., "Stress Relaxation in the Lamellar Copolymer Mesophase", Macromolecules, vol. 23, pp. 824-829 (1990).
Wooley, Karen L, "From Dendrimers to Knedel-like Structures", Chem. Eur. J., 3, No. 9, pp. 1397-1399 (1997).
Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).
Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).
Worsfold, D.J., "Anionic Copolymerization of Styrene with p-Divinylbenzene", Macromolecules, vol. 3, No. 5, pp. 514-517 (Sep.-Oct. 1970).
Zheng, Lei et al., "Polystyrene Nanoparticles with Anionically Polymerized Polybutadiene Brushes", Macromolecules, 37, pp. 9954-9962 (2004).
Zilliox, Jean-Georges et al., "Preparation de Macromolecules a Structure en Etoile, par Copolymerisation Anionique", J. Polymer Sci.: Part C, No. 22, pp. 145-156 (1968).
"Quaternary Ammonium Compounds", Encyclopedia of Chem Tech., 4th Ed., vol. 20, pp. 739-767 (1996).
Vulcanization Agents and Auxiliary Materials, Kirk-Othmer, Encyclopedia of Chemical Technology, 3rd Ed., Wiley Interscience, NY, 1982, vol. 22, pp. 390-403.
Bridgestone Americas 2006 Presentation (14 pp.).
Lipman, Bernard, Mar. 26, 2002 Notice of Allowance from U.S. Appl. No. 09/970,830 (4 pp.).
Kiliman, Leszek B., Feb. 13, 2003 Office from U.S. Appl. No. 10/038,748 (3 pp.).
Kiliman, Leszak B., Aug. 25, 2003 Notice of Allowance from U.S. Appl. No. 10/038,748 (5 pp.).
Harlan, Robert D., Mar. 17, 2004 Restriction/Election Office Action from U.S. Appl. No. 10/223,393 (6 pp.).
Harlan, Robert D., Jun. 22, 2004 Office Action from U.S. Appl. No. 10/223,393 (6 pp.).
Harlan, Robert D., Jan. 3, 2005 Notice of Allowance from U.S. Appl. No. 10/223,393 (6 pp.).
Lipman, Bernard, Mar. 25, 2004 Restriction/Election Office Action from U.S. Appl. No. 10/331,841 (6 pp.).
Lipman, Bernard, Nov. 18, 2004 Notice of Allowance from U.S. Appl. No. 10/331,841 (5 pp.).
Lipman, Bernard, Mar. 24, 2004 Restriction/Election Office Action from U.S. Appl. No. 10/345,498 (5 pp.).
Lipman, Bernard, Nov. 23, 2004 Notice of Allowance from U.S. Appl. No. 10/345,498 (5 pp.).
Choi, Ling Siu, Mar. 24, 2006 Office Action from U.S. Appl. No. 10/755,648 (11 pp.).
Choi, Ling Siu, Dec. 4, 2006 Notice of Allowance from U.S. Appl. No. 10/755,648 (9 pp.).
Asinovsky, Olga, Jun. 20, 2006 Office Action from U.S. Appl. No. 10/791,049 (11 pp.).

(56) References Cited

OTHER PUBLICATIONS

Asinovsky, Olga, Dec. 22, 2006 Office Action from U.S. Appl. No. 10/791,049 (11 pp.).
Asinovsky, Olga, Jun. 7, 2007 Office Action from U.S. Appl. No. 10/791,049 (11 pp.).
Asinovsky, Olga, Aug. 16, 2007 Advisory Action from U.S. Appl. No. 10/791,049 (2 pp.).
Asinovsky, Olga, Nov. 28, 2007 Office Action from U.S. Appl. No. 10/791,049 (9 pp.).
Asinovsky, Olga, May 21, 2008 Office Action from U.S. Appl. No. 10/791,049 (11 pp.).
Asinovsky, Olga, Jul. 29, 2008 Advisory Action from U.S. Appl. No. 10/791,049 (3 pp.).
Asinovsky, Olga, Sep. 11, 2008 Office Action from U.S. Appl. No. 10/791,049 (12 pp.).
Mullis, Jeffrey C., Mar. 11, 2009 Office Action from U.S. Appl. No. 10/791,049 (9 pp.).
Mullis, Jeffrey C., May 19, 2009 Advisory Action from U.S. Appl. No. 10/791,049 (5 pp.).
Mullis, Jeffrey C., Mar. 30, 2011 Decision on Appeal from U.S. Appl. No. 10/791,049 [7 pp.].
Ronesi, Vickey M., Jan. 8, 2007 Office Action from U.S. Appl. No. 10/791,177 (5 pp.).
Harlan, Robert D., May 3, 2007 Office Action from U.S. Appl. No. 10/791,177 (6 pp.).
Harlan, Robert D., Oct. 18, 2007 Office Action from U.S. Appl. No. 10/791,177 (6 pp.).
Harlan, Robert D., Jan. 9, 2008 Advisory Action from U.S. Appl. No. 10/791,177 (3 pp.).
Harlan, Robert D., Mar. 7, 2008 Advisory Action from U.S. Appl. No. 10/791,177 (3 pp.).
Harlan, Robert D., May 28, 2008 Office Action from U.S. Appl. No. 10/791,177 (8 pp.).
Harlan., Robert D., Dec. 10, 2008 Final Office Action from U.S. Appl. No. 10/791,177 (8 pp.).
Harlan, Robert D., Mar. 11, 2009 Notice of Allowance from U.S. Appl. No. 10/791,177 (8 pp.).
Harlan, Robert D., Dec. 29, 2009 Notice of Allowance from U.S. Appl. No. 10/791,177 (6 pp.).
Le, Hoa T., Dec. 14, 2004 Office Action from U.S. Appl. No. 10/791,491 (5 pp.).
Le, Hoa T., Jul. 5, 2005 Office Action from U.S. Appl. No. 10/791,491 (9 pp.).
Le, Hoa T., Apr. 10, 2006 Notice of Allowance from U.S. Appl. No. 10/791,491 (5 pp.).
Kiliman, Leszek B., Sep. 9, 2005 Office Action from U.S. Appl. No. 10/817,995 (7 pp.).
Kiliman, Leszek B., Mar. 23, 2006 Office Action from U.S. Appl. No. 10/817,995 (7 pp.).
Kiliman, Leszek B., Dec. 13, 2006 Office Action from U.S. Appl. No. 10/817,995 (6 pp.).
Kiliman, Leszak B., May 15, 2007 Advisory Action from U.S. Appl. No. 10/817,995 (2 pp.).
Kiliman, Leszak B., Apr. 2, 2008 Notice of Allowance from U.S. Appl. No. 10/817,995 (5 pp.).
Kiliman, Leszek B., Sep. 5, 2008 Office Action from U.S. Appl. No. 10/817,995 (5 pp.).
Kiliman, Leszek B., Mar. 19, 2009 Office Action from U.S. Appl. No. 10/817,995 (5 pp.).
Kiliman, Leszek B., Nov. 13, 2009 Office Action from U.S. Appl. No. 10/817,995 (6 pp.).
Ducheneaux, Frank D., Jun. 8, 2010 Office Action from U.S. Appl. No. 10/817,995 [19 pp.].
Ducheneaux, Frank D., Dec. 28, 2010 Final Office Action from U.S. Appl. No. 10/817,995 [24 pp.].
Ducheneaux, Frank D., Apr. 4, 2011 Advisory Action from U.S. Appl. No. 10/817,995 [6 pp.].
Wyrozebski Lee, Katarzyna I., Dec. 19, 2006 Office Action from U.S. Appl. No. 10/872,731 (6 pp.).
Wyrozebski Lee, Katarzyna I., Mar. 7, 2007 Office Action from U.S. Appl. No. 10/872,731 (13 pp.).
Wyrozebski Lee, Katarzyna I., Sep. 14, 2007 Office Action from U.S. Appl. No. 10/872,731 (9 pp.).
Chevalier, Alicia Ann, Sep. 6, 2006 Office Action from U.S. Appl. No. 10/886,283 (5 pp.).
Chevalier, Alicia Ann, Jan. 4, 2007 Office Action from U.S. Appl. No. 10/886,283 (8 pp.).
Chevalier, Alicia Ann, Jul. 2, 2007 Office Action from U.S. Appl. No. 10/886,283 (8 pp.).
Chevalier, Alicia Ann, Jan. 4, 2008 Office Action from U.S. Appl. No. 10/886,283 (8 pp.).
Chevalier, Alicia Ann, Nov. 25, 2009 Office Action from U.S. Appl. No. 10/886,283 (7 pp.).
Chevalier, Alicia Ann, May 3, 2010 Final Office Action from U.S. Appl. No. 10/886,283 (8 pp.).
Chevalier, Alicia Ann, Jul. 8, 2010 Advisory Action from U.S. Appl. No. 10/886,283 [3 pp.].
Chevalier, Alicia Ann, Nov. 23, 2010 Office Action from U.S. Appl. No. 10/886,283 [6 pp.].
Rosenberg, Nancy D., Apr. 12, 2011 Notice of Allowance from U.S. Appl. No. 10/886,283 [4 pp.].
Mullis, Jeffrey C., Oct. 31, 2006 Office Action from U.S. Appl. No. 11/050,115 (6 pp.).
Mullis, Jeffrey C., Mar. 24, 2008 Office Action from U.S. Appl. No. 11/050,115 (10 pp.).
Mullis, Jeffrey C., Aug. 21, 2008 Office Action from U.S. Appl. No. 11/050,115 (7 pp.).
Mullis, Jeffrey C., Nov. 5, 2008 Advisory Action from U.S. Appl. No. 11/050,115 (4 pp.).
Mullis, Jeffrey C., Feb. 25, 2009 Office Action from U.S. Appl. No. 11/050,115 (8 pp.).
Mullis, Jeffrey C., Sep. 21, 2009 Notice of Allowance from U.S. Appl. No. 11/050,115 (4 pp.).
Mullis, Jeffrey C., Dec. 18, 2009 Supplemental Notice of Allowability from U.S. Appl. No. 11/050,115 (2 pp.).
Lipman, Bernard., Sep. 29, 2006 Office Action from U.S. Appl. No. 11/058,156 (5 pp.).
Lipman, Bernard, May 21, 2007 Notice of Allowance from U.S. Appl. No. 11/058,156 (3 pp.).
Lipman, Bernard, Aug. 28, 2007 Notice of Allowance from U.S. Appl. No. 11/058,156 (5 pp.).
Lipman, Bernard, Feb. 28, 2008 Notice of Allowance from U.S. Appl. No. 11/058,156 (5 pp.).
Lipman, Bernard, May 29, 2008 Notice of Allowance from U.S. Appl. No. 11/058,156 (5 pp.).
Lipman, Bernard, Jan. 14, 2009 Notice of Allowance from U.S. Appl. No. 11/058,156 (5 pp.).
Lipman, Bernard, Oct. 3, 2006 Notice of Allowance from U.S. Appl. No. 11/064,234 (5 pp.).
Raza, Saira B., Oct. 20, 2005 Office Action from U.S. Appl. No. 11/104,759 (12 pp.).
Raza, Saira B., Aug. 21, 2006 Final Office Action from U.S. Appl. No. 11/104,759 (14 pp.).
Haider, Saira Bano, Dec. 22, 2006 Advisory Action from U.S. Appl. No. 11/104,759 (3 pp.).
Haider, Saira Bano, May 16, 2007 Office Action from U.S. Appl. No. 11/104,759 (9 pp.).
Haider, Saira Bano, Oct. 30, 2007 Final Office Action from U.S. Appl. No. 11/104,759 (11 pp.).
Haider, Saira Bano, Mar. 19, 2008 Advisory Action from U.S. Appl. No. 11/104,759 (3 pp.).
Haider, Saira Bano, Jun. 12, 2008 Office Action from U.S. Appl. No. 11/104,759 (10 pp.).
Haider, Saira Bano, Dec. 2, 2008 Office Action from U.S. Appl. No. 11/104,759 (10 pp.).
Haider, Saira Bano, Mar. 3, 2009 Advisory Action from U.S. Appl. No. 11/104,759 (3 pp.).
Haider, Saira Bano, Sep. 11, 2009 Examiner's Answer from U.S. Appl. No. 11/104,759 (9 pp.).
Haider, Saira Bano, Feb. 9, 2011 Decision on Appeal from U.S. Appl. No. 11/104,759 [4 pp.].

(56) References Cited

OTHER PUBLICATIONS

Harlan, Robert D., Nov. 7, 2005 Office Action from U.S. Appl. No. 11/117,981 (7 pp.).
Harlan, Robert D., Jul. 20, 2006 Office Action from U.S. Appl. No. 11/117,981 (6 pp.).
Harlan, Robert D., Jan. 26, 2007 Office Action from U.S. Appl. No. 11/117,981 (8 pp.).
Harlan, Robert D., Jul. 12, 2007 Office Action from U.S. Appl. No. 11/117,981 (6 pp.).
Harlan, Robert D., Jan. 2, 2008 Office Action from U.S. Appl. No. 11/117,981 (6 pp.).
Harlan, Robert D., Jul. 25, 2008 Office Action from U.S. Appl. No. 11/117,981 (8 pp.).
Harlan, Robert D., Jan. 9, 2009 Office Action from U.S. Appl. No. 11/117,981 (6 pp.).
Harlan, Robert D., Apr. 30, 2009 Office Action from U.S. Appl. No. 11/117,981 (7 pp.).
Harlan, Robert D., Sep. 29, 2009 Final Office Action from U.S. Appl. No. 11/117,981 (6 pp.).
Harlan, Robert D., Dec. 4, 2009 Notice of Allowance from U.S. Appl. No. 11/117,981 (5 pp.).
Lipman, Bernard, Sep. 14, 2006 Office Action from U.S. Appl. No. 11/168,297 (4 pp.).
Lipman, Bernard, Mar. 2, 2007 Notice of Allowance from U.S. Appl. No. 11/168,297 (3 pp.).
Lipman, Bernard, Apr. 18, 2007 Supplemental Notice of Allowability from U.S. Appl. No. 11/168,297 (3 pp.).
Maksymonko, John M., Feb. 20, 2008 Office Action from U.S. Appl. No. 11/305,279 (14 pp.).
Maksymonko, John M., Aug. 6, 2008 Office Action from U.S. Appl. No. 11/305,279 (11 pp.).
Zemel, Irina Sopja, Jan. 22, 2009 Advisory Action from U.S. Appl. No. 11/305,279 (2 pp.).
Zemel, Irina Sopja, May 28, 2009 Office Action from U.S. Appl. No. 11/305,279 (7 pp.).
Zemel, Irina Sopja, Dec. 3, 2009 Final Office Action from U.S. Appl. No. 11/305,279 (10 pp.).
Maksymonko, John M., Jul. 17, 2008 Office Action from U.S. Appl. No. 11/305,281 (13 pp.).
Lipman, Bernard, Jan. 28, 2009 Notice of Allowance from U.S. Appl. No. 11/305,281 (5 pp.).
Le, Hoa T., Sep. 25, 2008 Office Action from U.S. Appl. No. 11/612,554 (8 pp.).
Le, Hoa T., May 14, 2009 Notice of Allowance from U.S. Appl. No. 11/612,554 (4 pp.).
Maksymonko, John M., Jun. 13, 2008 Office Action from U.S. Appl. No. 11/641,514 (7 pp.).
Mullis, Jeffrey C., Oct. 31, 2008 Office Action from U.S. Appl. No. 11/641,514 (10 pp.).
Mullis, Jeffrey C., Apr. 30, 2009 Final Office Action from U.S. Appl. No. 11/641,514 (11 pp.).
Mullis, Jeffrey C., Jul. 15, 2009 Advisory Action from U.S. Appl. No. 11/641,514 (4 pp.).
Mullis, Jeffrey C., Nov. 9, 2009 Office Action from U.S. Appl. No. 11/641,514 (9 pp.).
Mullis, Jeffrey C., May 26, 2010 Final Office Action from U.S. Appl. No. 11/641,514 [8 pp.].
Mullis, Jeffrey C., Aug. 12, 2010 Advisory Action from U.S. Appl. No. 11/641,514 [4 pp.].
Mullis, Jeffrey C., Oct. 8, 2010 Notice of Allowance from U.S. Appl. No. 11/641,514 [2 pp.].
Maksymonko, John M., Jun. 11, 2008 Office Action from U.S. Appl. No. 11/642,124 (16 pp.).
Cain, Edward J., Dec. 31, 2008 Notice of Allowance from U.S. Appl. No. 11/642,124 (5 pp.).
Cain, Edward J., Mar. 31, 2009 Notice of Allowance from U.S. Appl. No. 11/642,124 (5 pp.).
Maksymonko, John M., May 30, 2008 Office Action from U.S. Appl. No. 11/642,795 (12 pp.).
Cain, Edward J., Dec. 9, 2008 Final Office Action from U.S. Appl. No. 11/642,795 (6 pp.).
Cain, Edward J., Feb. 23, 2009 Notice of Allowance from U.S. Appl. No. 11/642,795 (5 pp.).
Wheeler, Thurman Michael, Oct. 14, 2009 Restriction/Election Office Action from U.S. Appl. No. 11/642,796 (8 pp.).
Wheeler, Thurman Michael, Feb. 8, 2010 Office Action from U.S. Appl. No. 11/642,796 (13 pp.).
Wheeler, Thurman Michael, Jul. 30, 2010 Final Office Action from U.S. Appl. No. 11/642,796 [15 pp.].
Wheeler, Thurman Michael, May 31, 2011 Office Action from U.S. Appl. No. 11/642,796 (12 pp.).
Maksymonko, John M., May 28, 2008 Office Action from U.S. Appl. No. 11/642,802 (10 pp.).
Mulcahy, Peter D., Dec. 11, 2008 Restriction/Election Office Action from U.S. Appl. No. 11/642,802 (7 pp.).
Mulcahy, Peter D., May 13, 2009 Office Action from U.S. Appl. No. 11/642,802 (7 pp.).
Mulcahy, Peter D., Nov. 9, 2009 Final Office Action from U.S. Appl. No. 11/642,802 (6 pp.).
Peets, Monique R., May 11, 2009 Restriction/Election Office Action from U.S. Appl. No. 11/697,801 (6 pp.).
Peets, Monique R., Jul. 20, 2009 Office Action from U.S. Appl. No. 11/697,801 (9 pp.).
Peets, Monique R., Jan. 5, 2010 Final Office Action from U.S. Appl. No. 11/697,801 (9 pp.).
Peets, Monique R., Apr. 15, 2010 Notice of Allowance from U.S. Appl. No. 11/697,801 (5 pp.).
Lipman, Bernard, Mar. 20, 2008 Office Action from U.S. Appl. No. 11/764,607 (4 pp.).
Lipman, Bernard, Sep. 25, 2008 Notice of Allowance from U.S. Appl. No. 11/764,607 (3 pp.).
Lipman, Bernard, Jan. 27, 2009 Notice of Allowance from U.S. Appl. No. 11/764,607 (4 pp.).
Mullis, Jeffrey C., Mar. 3, 2010 Restriction/Election Office Action from U.S. Appl. No. 11/771,659 (7 pp.).
Mullis, Jeffrey C., Jun. 30, 2010 Notice of Allowance from U.S. Appl. No. 11/771,659 [5 pp.].
Sykes, Altrev C., Mar. 20, 2009 Office Action from U.S. Appl. No. 11/818,023 (27 pp.).
Sykes, Altrev C., Oct. 16, 2009 Office Action from U.S. Appl. No. 11/818,023 (20 pp.).
Sykes, Altrev C., Apr. 5, 2010 Final Office Action from U.S. Appl. No. 11/818,023 (24 pp.).
Syes, Altrev C., Oct. 22, 2010 Advisory Action from U.S. Appl. No. 11/818,023 [2 pp.].
Sykes, Altrev C., Oct. 29, 2010 Examiner's Answer from U.S. Appl. No. 11/818,023 [24 pp.].
Pak, Hannah J., Apr. 2, 2009 Office Action from U.S. Appl. No. 11/941,128 (9 pp.).
Pak, Hannah J., Jan. 6, 2010 Final Office Action from U.S. Appl. No. 11/941,128 (10 pp.).
Pak, Hannah J., Apr. 30, 2010 Notice of Allowance from U.S. Appl. No. 11/941,128 (11 pp.).
Egwim, Kelechi Chidi, Sep. 30, 2010 Office Action from U.S. Appl. No. 12/047,896 [6 pp.].
Egwim, Kelechi Chidi, Mar. 21, 2011 Final Office Action from U.S. Appl. No. 12/047,896 [6 pp.].
Egwim, Kelechi Chidi, Jun. 13, 2011 Advisory Action from U.S. Appl. No. 12/047,896 [2 pp.].
Mullis, Jeffrey C., May 23, 2011 Office Action from U.S. Appl. No. 12/288,174 (6 pp.).
Mullis, Jeffrey C., Jun. 3, 2011 Restriction/Election Office Action from U.S. Appl. No. 12/374,883 (7 pp.).
Mullis, Jeffrey C., Jul. 27, 2011 Office Action from U.S. Appl. No. 12/374,883 (13 pp.).
Harlan, Robert D., Dec. 28, 2009 Office Action from U.S. Appl. No. 12/504,255 (6 pp.).
Harlan, Robert D., May 13, 2010 Final Office Action from U.S. Appl. No. 12/504,255 (7 pp.).
Harlan, Robert D., Jun. 9, 2010 Office Action from U.S. Appl. No. 12/504,255 [6 pp.].

(56) References Cited

OTHER PUBLICATIONS

Harlan, Robert D., Dec. 1, 2010 Notice of Allowance from U.S. Appl. No. 12/504,255 [6 pp.].
Chen, Jizhuang, Dec. 30, 2005 Office Action from Chinese Patent Application No. 02819527.2 (9 pp.).
Chen, Jizhuang, Dec. 21, 2007 Office Action from Chinese Patent Application No. 02819527.2 (12 pp.).
Chen, Jizhuang, Sep. 26, 2008 Office Action from Chinese Patent Application No. 02819527.2 (4 pp.).
Zhang, Qian, Feb. 10, 2011 Office Action from Chinese Patent Application No. 200780036040.X with English translation (12 pp.).
Xia, Lanying, Jul. 6, 2011 Office Action with English translation from Chinese Patent Application No. 200780047895.2 [8 pp.].
Schutte, M., Aug. 8, 2006 Office Action from European Patent Application No. 02807196.7 (5 pp.).
Schutte, Maya, Sep. 3, 2007 Office Action from European Patent Application No. 02807196.7 (2 pp.).
Russell, Graham, Nov. 4, 2008 Office Action from European Patent Application No. 05742316.2 (2 pp.).
Mensah, Laure, Dec. 15, 2009 Extended European Search Report from European Patent Application No. 07813483.0 (4 pp.).
Mensah, Laure, Sep. 20, 2010 Office Action from European Patent Application No. 07813483.0 [4 pp.].
Watanabe, Y., May 7, 2008 Office Action from Japanese Patent Application No. 582224/2003 (5 pp.).
Watanabe, Y., Jul. 29, 2008 Office Action from Japanese Patent Application No. 582224/2003 (17 pp.).
Schutte, M., Nov. 13, 2003 International Search Report from PCT Patent Application No. PCT/US02/31817 (3 pp.).
Schutte, M., May 28, 2004 International Search Report from PCT Patent Application No. PCT/US03/40375 (3 pp.).
Iraegui Retolaza, E., Jul. 9, 2004 International Search Report from PCT Patent Application No. PCT/US2004/001000 (3 pp.).
Russell, G., Aug. 1, 2005 International Search Report from PCT Patent Application No. PCT/US2005/010352 (3 pp.).
Johnson, Edward M., Dec. 12, 2008 International Search Report from PCT Application No. PCT/US07/74611 (5 pp.).
Iraegui Retolaza, E., May 30, 2008 International Search Report from PCT Patent Application No. PCT/US2007/026031 (4 pp.).
Cussac, Yolaine, Jun. 24, 2009 International Preliminary Report on Patentability from PCT Patent Application No. PCT/US2007/026031 (7 pp.).
Mettler, Rolf-Martin, May 27, 2008 International Search Report from PCT Patent Application No. PCT/US2007/087869 (4 pp.).
Hammon, Andrew, Aug. 25, 2008 International Search Report from PCT Patent Application No. PCT/US2008/068838 (4 pp.).
Brovkina, T.A., English translation of May 4, 2011 Office Action from Russian Patent Application No. 2009107218 [7 pp.].
Park, Jong Chul, Aug. 3, 2010 International Search Report from PCT/US2009/069680 [3 pp.].
Wang, Xiaorong et al., U.S. Appl. No. 10/791,049 filed Mar. 2, 2004 entitled "Method of Making Nano-Particles of Selected Size Distribution".
Wang, Xiaorong et al., U.S. Appl. No. 10/791,177 filed Mar. 2, 2004 entitled "Rubber Composition Containing Functionalized Polymer Nanoparticles".
Wang, Xiaorong et al., U.S. Appl. No. 10/872,731 filed Jun. 21, 2004 entitled "Reversible Polymer/Metal Nano-Composites and Method for Manufacturing Same".
Wang, Xiaorong et al., U.S. Appl. No. 10/886,283, filed Jul. 6, 2004 entitled "Hydropobic Surfaces with Nanoparticles".
Wang, Xiaorong et al., U.S. Appl. No. 11/058,156, filed Feb. 15, 2005 entitled "Multi-Layer Nano-Particle Preparation and Applications".
Wang, Xiaorong et al., U.S. Appl. No. 11/104,759, filed Apr. 13, 2005 entitled "Nano-Particle Preparation and Applications".
Bohm, Georg G.A. et al., U.S. Appl. No. 11/117,981, filed Apr. 29, 2005 entitled "Self Assembly of Molecules to Form Nano-Particle".
Wang, Xiaorong et al., U.S. Appl. No. 11/305,279, filed Dec. 16, 2005 entitled "Combined Use of Liquid Polymer and Polymeric Nanoparticles for Rubber Applications".

Wang, Xiaorong et al., U.S. Appl. No. 11/344,861, filed Feb. 1, 2006 entitled "Nano-Composite and Compositions Therefrom".
Wang, Xiaorong et al., U.S. Appl. No. 11/642,796, filed Dec. 20, 2006 entitled "Hollow Nano-Particles and Method Thereof".
Wang, Xiaorong et al., U.S. Appl. No. 11/764,607, filed Jun. 18, 2007 entitled "Multi-Layer Nano-Particle Preparation and Applications".
Warren, Sandra, U.S. Appl. No. 11/771,659, filed Jun. 29, 2007 entitled "One-Pot Synthesis of Nanoparticles and Liquid Polymer for Rubber Applications".
Wang, Xiaorong et al., U.S. Appl. No. 11/941,128, filed Nov. 16, 2007 entitled "Nano-Particle Preparation and Applications".
Wang, Xiaorong et al., U.S. Appl. No. 11/954,268, filed Dec. 12, 2007 entitled "Nanoporous Polymeric Material and Preparation Method".
Wang, Xiaorong et al., U.S. Appl. No. 12/047,896, filed Mar. 13, 2008 entitled "Reversible Polymer/Metal Nano-Composites and Method for Manufacturing Same".
Wang, Xiaorong et al., U.S. Appl. No. 12/184,895, filed Aug. 1, 2008 entitled "Disk-Like Nanoparticles".
Wang, Xiaorong et al., U.S. Appl. No. 12/374,883 international filed Jul. 27, 2007, entitled "Polymeric Core-Shell Nanoparticles with Interphase Region".
Wang, Xiaorong et al., U.S. Appl. No. 12/754,367, filed Apr. 5, 2010 entitled "Hairy Polymeric Nanoparticles With First and Second Shell Block Polymer Arms".
Berger, Sebastian et al., "Stimuli-Responsive Bicomponent Polymer Janus Particles by 'Grafting from'/ 'Grafting to' Approaches," Macromolecules, 41, pp. 9669-9676 (2008).
Cheng, Lin et al., "Efficient Synthesis of Unimolecular Polymeric Janus Nanoparticles and Their Unique Self-Assembly Behavior in a Common Solvent," Macromolecules, 41, pp. 8159-8166 (2008).
Dendukuri, Dhananjay et al., "Synthesis and Self-Assembly of Amphiphilic Polymeric Microparticles," Langmuir, 23, pp. 4669-4674 (2007).
The Dow Chemical Company, "DVB Cross-link a variety of materials for improved thermal, physical, and chemical properties," 44 pp. (Jan. 2003).
Robertson, C.G. et al., "Effect of structural arrest on Poisson's ratio in nanoreinforced elastomers," Physical Review E, vol. 75, pp. 051403-1 thru 051403-7 (2007).
Schacher, Felix et al., "Multicompartment Core Micelles of Triblock Terpolymers in Organic Media," Macromolecules, 42, pp. 3540-3548 (2009).
Tsitsilianis, Constantinos, "Phase Behavior of Heteroarm Star Copolymers by Differential Scanning Calorimetry," Macromolecules, 26, pp. 2977-2980 (1993).
Walther, Andreas et al., "Engineering Nanostructured Polymer Blends with Controlled Nanoparticle Location using Janus Particles," ACS Nano., 2(6), pp. 1167-1178 (2008).
Walther, Andreas et al., "Janus Particles," Soft Matter, 4, pp. 663-668 (2008).
Wang, Y. et al., "Janus-Like Polymer Particles Prepared Via Internal Phase Separation from Emulsified Polymer/Oil Droplets," Polymer, vol. 50, No. 14, pp. 3361-3369 (2009).
Zhang, Jian et al., "Bioconjugated Janus Particles Prepared by in Situ Click Chemistry," Chemistry of Materials, 21, pp. 4012-4018 (2009).
Zhao, Bin et al., "Mixed Polymer Brush-Grafted Particles: A New Class of Environmentally Responsive Nanostructured Materials," Macromolecules, 42, pp. 9369-9383 (2009).
Mullis, Jeffrey C., Feb. 9, 2011 Restriction/Election Office Action from U.S. Appl. No. 12/288,174 (8 pp.).
Brovkina, T.A., Oct. 12, 2011 Office Action from Russian Patent Application No. 2009107218 with English translation (8 pp.).
Nov. 3, 2011 Office Action with English translation from Chinese Patent Application No. 200780036040.X (12 pp.).
Mulcahy, Peter D., Nov. 9, 2011 Office Action from U.S. Appl. No. 11/642,802 (6 pp.).
Fink, Brieann R., Dec. 1, 2011 Office Action from U.S. Appl. No. 12/754,367 (15 pp.).
Mullis, Jeffrey C., Feb. 1, 2012 Office Action from U.S. Appl. No. 12/374,883 (9 pp.).
Zemei, Irina Sopja, Apr. 30, 2012 Decision on Appeal from U.S. Appl. No. 11/305,279 (12 pp.).

(56) References Cited

OTHER PUBLICATIONS

Wang, Chun Cheng, May 4, 2012 Office Action from U.S. Appl. No. 12/555,183 (9 pp.).
Hoffer, Thomas, May 22, 2012 Supplementary European Search Report with Search Opinion from European Patent Application No. 09837105.7 (5 pp.).
Watanabe, Yoko, May 22, 2012 Office Action with English translation from Japanese Patent Application No. 2008-248866 (5 pp.).
Malashkova, E.S., Jun. 1, 2012 Office Action with English translation from Russian Patent Application No. 2010102943 (10 pp.).
Fink, Brieann R., Jun. 6, 2012 Final Office Action from U.S. Appl. No. 12/754,367 (13 pp.).
Adams, Donald E. et al., Jun. 18, 2012 Decision on Appeal from U.S. Appl. No. 11/818,023 (13 pp.).
Kaucher, Mark S., Nov. 5, 2012 Office Action from U.S. Appl. No. 12/979,732 (24 pp.).
Wheeler, Thurman Michael, Nov. 6, 2012 Office Action from U.S. Appl. No. 11/642,796 (14 pp.).
Sykes, Altrev C., Nov. 8, 2012 Final Office Action from U.S. Appl. No. 11/818,023 (20 pp.).
Mulcahy, Peter D., Dec. 6, 2012 Final Office Action from U.S. Appl. No. 11/642,802 (7 pp.).
Kaucher, Mark S., Dec. 18, 2012 Office Action from U.S. Appl. No. 13/142,770 (19 pp.).
Min, Ke et al., "Atom Transfer Radical Dispersion Polymerization of Styrene in Ethanol," Macromolecules, vol. 40, pp. 7217-7222 (2007).
Papadopoulos, P. et al., "Origin of Glass Transition of Poly(2-vinylpyridine). A Temperature- and Pressure-Dependent Dielectric Spectroscopy Study," Macromolecules, vol. 37, pp. 8116-8122 (2004).
Nakamura, Eiji, Mar. 26, 2013 Office Action with English translation from Japanese Application No. 2009-522021 (9 pp.).
Giesemann, Gerhard, Apr. 8, 2013 Office Action from European Application No. 08772275.7 (4 pp.).
Inoue, M., Jun. 4, 2013 Office Action with English translation from Japanese Application No. 2009-543130 (6 pp.).
Chinese Patent Office, Jun. 28, 2013 Office Action with English translation from Chinese Application No. 200980157756.4 (13 pp.).
Wheeler, Thurman Michael, Jul. 5, 2013 Final Office Action from U.S. Appl. No. 11/642,796 (10 pp.).
Chinese Patent Office, Sep. 4, 2013 Office Action with English translation from Chinese Application No. 200780036040.X (18 pp.).
Sykes, Altrev C., Sep. 5, 2013 Office Action from U.S. Appl. No. 11/818,023 (22 pp.).
Zemel, Irina Sophia, Sep. 30, 2013 Final Office Action from U.S. Appl. No. 11/305,279 (7 pp.).
Fink, Brieann R., Sep. 30, 2013 Office Action from U.S. Appl. No. 12/754,367 (14 pp.).
Uchida, Y., Oct. 1, 2013 Office Action with English translation from Japanese Application No. 2010-515229 (9 pp.).
Schwab, F.C. et al., "Anionic Dispersion Polymerization of Styrene," Advances in Polymer Synthesis, vol. 31, pp. 381-404 (1985).
Korean Patent Office, Nov. 28, 2013 Office Action from Korean Application No. 10-2009-7004191 (7 pp.).
Chinese Patent Office, Dec. 4, 2013 Office Action from Chinese Application No. 200980157756.4 (8 pp.).
Mulcahy, Peter D., Dec. 10, 2013 Notice of Allowance from U.S. Appl. No. 11/642,802 (2 pp.).
Zemel, Irina Sophia, Jan. 3, 2014 Advisory Action from U.S. Appl. No. 11/305,279 (3 pp.).
Kaucher, Mark S., Jan. 31, 2014 Final Office Action from U.S. Appl. No. 13/142,770 (8 pp.).
Nakamura, Eiji, Feb. 12, 2014 Office Action with English translation from Japanese Application No. 2009-522021 (11 pp.).
Sykes, Altrev C., Feb. 14, 2014 Final Office Action from U.S. Appl. No. 11/818,023 (26 pp.).

\* cited by examiner

WELL DEFINED, HIGHLY CROSSLINKED NANOPARTICLES AND METHOD FOR MAKING SAME

CROSS-REFERENCE TO RELATED APPLICATION

This application claims the benefit of priority from U.S. Provisional Application No. 61/290,755, filed on Dec. 29, 2009. That prior application, including the entire written description and drawing figures, is hereby incorporated into the present application by reference.

FIELD

The technology disclosed herein is generally related to nanoparticles. This disclosure also provides a method of making such nanoparticles.

BACKGROUND AND SUMMARY

Polymer nanoparticles have attracted increased attention over the past several years in a variety of fields including catalysis, combinatorial chemistry, protein supports, magnets, and photonic crystals. Nanoparticles have been used in rubber compositions to improve physical properties of rubber moldability and tenacity. In some instances the inclusion of polymer compositions with certain functional groups or heteroatomic monomers can produce beneficial and unexpected improvements in rubber compositions.

Charged nanoparticles may have a number of possible applications, such as in electronic devices, or in rubber or other polymer matrices. In some electronic display applications, such as QR-LPD, charged particles may be used to present a pictorial or textual display. It is a challenge, however, to provide particles that have a durable constitution and a stable charge. It is also a challenge to produce durable nanoparticles that are very hard and have highly spherical surfaces.

Herein, a method is provided for making nanoparticles, including the steps of: combining a hydrocarbon solvent and an aprotic, polar co-solvent, a mono-vinyl aromatic monomer, polymerization initiator, a solution stabilizer, and a first charge of a cross-linking agent. Subsequently, a second charge of cross-linking agent is added. The nanoparticles have an average diameter of 5 nanometers to about 10,000 nanometers.

Furthermore, spherical cross-linked nanoparticles are also provided. The spherical nanoparticles have a core formed from a polymeric seed that includes a mono-vinyl aromatic core species cross-linked with a cross-linking agent. The core has an average diameter of 5 nanometers to 10,000 nanometers. The mono-vinyl aromatic core species comprises polymeric chains radiating from a center of the core. Furthermore, the nanoparticles meet the following equation:

$$0.90 \leq (D1/D2) \leq 1.1$$

wherein D1 is a first diameter of a nanoparticle and D2 is a second diameter of the nanoparticle, and D1 and D2 intersect at right angles.

Furthermore, spherical cross-linked nanoparticles are also provided. The spherical nanoparticles have a core formed from a polymeric seed that includes a mono-vinyl aromatic core species cross-linked with a cross-linking agent. The core has an average diameter of 5 nanometers to 10,000 nanometers, and the cross-linking agent comprises 30% to 60% by weight of the combined weight of the mono-vinyl aromatic species and the cross-linking agent. The mono-vinyl aromatic core species comprises polymeric chains radiating from a center of the core. Furthermore, the nanoparticles meet the following equation:

$$0.90 \leq (D1/D2) \leq 1.1$$

wherein D1 is a first diameter of a nanoparticle and D2 is a second diameter of the nanoparticle, and D1 and D2 intersect at right angles.

Herein throughout, unless specifically stated otherwise: "vinyl-substituted aromatic hydrocarbon" and "alkenylbenzene" are used interchangeably. Furthermore, the terms "a" and "the," as used herein, mean "one or more."

DETAILED DESCRIPTION

Figure 1:
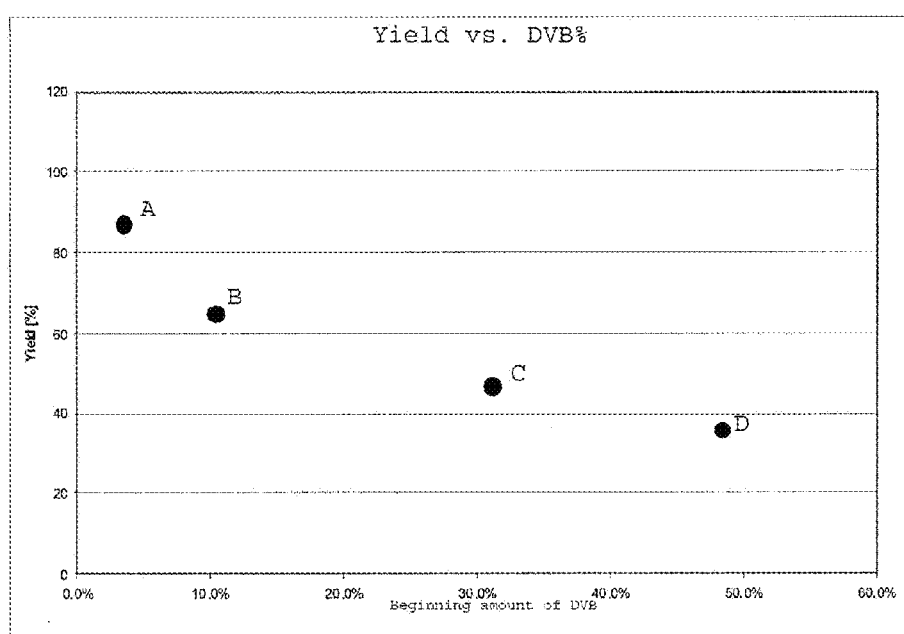
FIG. 1 is a graph showing yield % vs. beginning amount of cross-linking agent.

A method for making highly spherical, highly crosslinked nanoparticles is described herein. The method utilizes a core-first dispersion polymerization synthesis method in conjunction with a dual solvent system and a step-wise or metered addition of cross-linking agent. Synergistically, the dual solvent system and the step-wise or metered addition of cross-linking agent promote higher yields and better crosslinking and discrete, spherical particle shapes. The yield can reach up to complete conversion of the monomer and cross-linking agent.

Such nanoparticles may have various uses, including use as child particles in electronic displays such as electronic paper displays that use QR-LPD technology. Further details on QR-LPD and such particles are disclosed in U.S. Published Applications 2008/0174854 and 2006/0087718, and U.S. Pat. No. 7,236,291, which are incorporated herein by reference. A durable particle imparted with a stable charge is generally desirable, but it is especially desirable in QR-LPD displays where particles are subjected to significant frictional forces that tend to damage the structural and charge characteristics of the particles.

According to an embodiment of the method, the nanoparticle is formed by a core-first living dispersion polymerization method. Living anionic dispersion polymerization or living free radical dispersion polymerization may be used. Living anionic dispersion polymerization may be favorable over free radical dispersion polymerization for some applications. The living dispersion polymerization methods described herein are superior to emulsion synthesis methods for many applications. Furthermore, the nanoparticles synthesized by the methods described herein differ from star polymers in that they have a larger and decentralized core.

In dispersion polymerization, the reaction is effected by polymerizing a monomer in an organic liquid in which the resulting polymer is insoluble, using a steric stabilizer to stabilize the resulting particles of insoluble polymer in the organic liquid. Dispersion polymerization is used to prevent the propagating polymeric core from precipitating out of solution. This technique allows for a sizeable core to be formed in a range of about 5 nanometers up to about 10,000 nanometers while remaining in solution. Consequently, a wide range of solvents may be used in which the polymeric core would be otherwise insoluble.

Building on the flexibility for solvents provided by the core-first dispersion method, a dual solvent system is used in the method described herein. The dual solvent system includes a hydrocarbon solvent and an aprotic, polar co-solvent. The core monomer is soluble in the hydrocarbon solvent, but the polymerized monomer is relatively insoluble in the hydrocarbon solvent. The solvent also promotes aggregation of the poly(alkenylbenzene) and stabilization of the dispersion polymerization.

The co-solvent is an aprotic, polar solvent that promotes swelling of the formed particle and propagation of the polymer chains that comprise the nanoparticle. The polymer chains and modifiers are relatively soluble in the co-solvent while the monomer is relatively insoluble in the co-solvent. The co-solvent may also be a structural modifier. The monomers and polymer chains should both be soluble in the co-solvent.

Specific examples of solvents include aliphatic hydrocarbons, such as pentane, hexane, heptane, octane, nonane, and decane, as well as alicyclic hydrocarbons, such as cyclohexane, methyl cyclopentane, cyclooctane, cyclopentane, cycloheptane, cyclononane, and cyclodecane. These hydrocarbons may be used individually or in combination to comprise the hydrocarbon solvent of the dual solvent system. Selection of a solvent in which one monomer forming the nanoparticles is more soluble than another monomer forming the shell of the nanoparticles is preferred for some applications.

Specific examples of co-solvents include THF, dioxane, 2-methyl THF, diethyl ether, dimethyl sulfoxide, dimethylformamide, and hexamethylphosphorotriamide. These solvents may be used individually or in combination to comprise the polar, aprotic co-solvent of the dual solvent system.

The solvent and co-solvent may be added together or separately to the reactor. The volume ratio of hydrocarbon solvent to polar, aprotic solvent ranges from about 99.9:0.1 to about 70:30, such as about 85:15 to about 95:5, about 90:10 to about 99:1, or about 94:6 to about 98:2.

In a generalized embodiment of the core-formation step of the method, a reactor is provided with the dual solvent system, into which a mono-vinyl monomer species and a steric stabilizer are added. A polymerization initiator is also added to the reactor. A randomizing agent may also be added to the reactor.

A step-wise or metered addition of cross-linking agent is also begun at this point. In one embodiment, a first charge of cross-linking agent is added that is about 1 to about 50% of the total cross-linking agent to be charged, such as about 1 to about 20%, about 5.25 to about 11.5%, or about 3.5% to about 11.5%. The first charge may be added all at once or may be metered over time as the polymerization progresses.

Without being bound by theory, the incremental addition of cross-linking agent allows adjustment of the reactivity ratio of the monomer and cross-linking for randomizing the copolymerization.

The first charge of cross-linking agent and the initiator may be added in one charge to the reactor.

As the reaction proceeds, the mono-vinyl monomer is polymerized and cross-linked with the cross-linking agent. The mono-vinyl polymer chains are tied together by the first charge of cross-linking agent, wherein the mono-vinyl polymer chains have living ends at the surface of the core. The living ends are at the surface of the core due to their higher affinity to the solvent than the mono-vinyl species. The surface of the core is stabilized by the steric stabilizer, such as polystyrene-polybutadiene diblock copolymer. The stabilizer is adsorbed on the surface of the core.

After a substantial amount of monomer has been polymerized, i.e. a substantial monomer conversion, a second charge of cross-linking agent is added. For example, the second charge of cross-linking agent can be added after a monomer conversion of about 51 to about 100%, such as about 75 to about 100%, about 75 to about 95%, or about 90 to about 100%. The second charge of cross-linking agent is added, and may be added in a step-wise or metered manner. In one embodiment, the amount of the second charge of cross-linking agent is the difference between the total amount of cross-linking agent and the amount of cross-linking agent used in the first charge. In one embodiment, the second charge of cross-linking agent is added that is about 99 to about 50% of the total cross-linking agent to be charged, such as about 80 to about 99%, about 88.5 to about 94.75%, or about 88.5% to about 96.5%. The second charge may be added all at once or may be metered over time. In another embodiment, more than two charges may be used.

By this method a total yield of nanoparticles may approach about 100%, such as about 80 to about 98%, or about 85% to about 95%.

With respect to the monomers and solvents identified herein, nanoparticles are formed by maintaining a temperature that is favorable to polymerization of the selected monomers in the selected solvent(s). Reaction temperatures are, for example, in the range of about −40 to about 250° C., such as a temperature in the range of about 0 to about 150° C. The interaction of monomer selection, temperature and solvent, facilitates the formation of polymer chains which comprise the nanoparticle.

The ratio of mono-vinyl monomer species to total cross-linking agent may range from about 30:70 to about 90:10, such as about 57:43 to about 72:28, about 51:49 to about 65:35, or about 65:35 to about 85:15. The cross-linking agent can also work as a co-monomer at the outset of the polymerization.

The incremental addition of cross-linking agent can adjust the reactivity ratio of the monomer and cross-linking agent for randomizing the copolymerization. A more uniform structure of the particles is formed in the dual solvent system and it allows the partly formed nanoparticles to swell and incorporate the cross-linking agent more densely into the core structure.

The highly cross-linked core enhances the uniformity, durability, and permanence of shape and size of the resultant nanoparticle. The example method may be performed in a single batch, and there is no requirement to isolate and dry the core before grafting the shell.

Specific examples of mono-vinyl monomer species include mono-vinyl aromatic species, such as styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, as well as alkyl, cycloalkyl, aryl, alkaryl, and aralkyl derivatives thereof, in which the total number of carbon atoms in the combined hydrocarbon is not greater than 18, as well as any di- or tri-vinyl substituted aromatic hydrocarbons, and mixtures thereof. Further examples of mono-vinyl monomer species include non-aromatic mono-vinyl monomer species, such as vinyl acetate, vinyl-methacrylate, and vinyl-alcohols.

Crosslinking agents that are at least bifunctional, wherein the two functional groups are capable of reacting with the mono-vinyl species of the core are acceptable. Examples of suitable cross-linking agents include multiple-vinyl aromatic monomers in general. Specific examples of cross-linking agents include di- or tri-vinyl-substituted aromatic hydrocarbons, such as diisopropenylbenzene, divinylbenzene, divinyl ether, divinyl sulphone, diallyl phthalate, triallyl cyanurate, triallyl isocyanurate, 1,2-polybutadiene, N,N'-m-phenylene-dimaleimide, N,N'-(4-methyl-m-phenylene)dimaleimide, triallyl trimellitate acrylates, methacrylates of polyhydric $C_2$-$C_{10}$ alcohols, acrylates and methacrylates of polyethylene glycol having from 2 to 20 oxyethylene units, polyesters composed of aliphatic di- and/or polyols, or maleic acid, fumaric acid, and itaconic acid. Multiple-vinyl aromatics, such as divinylbenzene provides excellent properties and are compatible with common solvents.

Specific examples of suitable steric stabilizers include styrene-butadiene diblock copolymer, polystyrene-b-polyisoprene, and polystyrene-b-polydimethylsiloxane.

A 1,2-microstructure controlling agent or randomizing modifier is optionally used to control the 1,2-microstructure in the mono-vinyl monomer units of the core. Suitable modifiers include 2,2-bis(2'-tetrahydrofuryl)propane, hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), and bistetrahydrofuryl propane. A mixture of one or more randomizing modifiers also can be used. The ratio of the modifier to the monomers can vary from a minimum as low as 0 to a maximum as great as 4000 millimoles, for example 0.01 to 3000 millimoles, of modifier per hundred grams of monomer currently being charged into the reactor. As the modifier charge increases, the percentage of 1,2-microstructure (vinyl content) increases in the conjugated diene contributed monomer units in the surface layer of the polymer nanoparticle. The 1,2-microstructure content of the conjugated diene units is for example, within a range of about 5% and about 95%, such as less than about 35%.

Suitable initiators for the core formation process include anionic initiators that are known in the art as useful in the polymerization of mono and multiple-vinyl monomers. Exemplary organo-lithium initiators include lithium compounds having the formula $R(Li)_x$, wherein R represents a $C_1$-$C_{20}$ hydrocarbyl radical, such as a $C_2$-$C_8$ hydrocarbyl radical, and x is an integer from 1 to 4. Typical R groups include aliphatic radicals and cycloaliphatic radicals. Specific examples of R groups include primary, secondary, and tertiary groups, such as n-propyl, isopropyl, n-butyl, isobutyl, and t-butyl.

Specific examples of initiators include ethyllithium, propyllithium, n-butyllithium, sec-butyllithium, and tert-butyllithium; aryllithiums, such as phenyllithium and tolyllithium; alkenyllithiums such as vinyllithium, propenyllithium; alkylene lithium such as tetramethylene lithium, and pentamethylene lithium. Among these, n-butyllithium, sec-butyllithium, tert-butyllithium, tetramethylene lithium, and mixtures thereof are specific examples. Other suitable lithium initiators include one or more of: p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, and lithium diaryl phosphines.

Free radical initiators may also be used in conjunction with a free radical polymerization process. Examples of free-radical initiators include: 2,2'-azo-bis(isobutyronitril, 1,1'-azobis(cyclohexanecarbonitrile), 2,2'-azobis(2-methylpropionamidine)dihydrochloride, 2,2'-azobis(2-methylpropionitrile), 4,4'-azobis(4-cyanovaleric acid), 1,1-bis(tert-amylperoxy)cyclohexane, 1,1-bis(tert-butylperoxy)-3,3,5-trimethylcyclohexane, 1,1-bis(tert-butylperoxy)cyclohexane, 2,2-bis(tert-butylperoxy)butane, 2,4-pentanedione peroxide, 2,5-bis(tert-butylperoxy)-2,5-dimethylhexane, 2,5-bis(tert-butylperoxy)-2,5-dimethylhexane, 2-butanone peroxide, 2-butanone peroxide, 2-butanone peroxide, benzoyl peroxide, cumene hydroperoxide, di-tert-amyl peroxide, dicumyl peroxide, lauroyl peroxide, tert-butyl hydroperoxide, ammonium persulfate, hydroxymethanesulfinic acid monosodium salt dehydrate, potassium persulfate, and reagent grade sodium persulfate.

Functionalized lithium initiators are also contemplated as useful in the polymerization of the core species. A functionalized initiator serves to functionalize the core, and the functional groups are likely distributed throughout the surface and interior of the core. Example functional groups include amines, formyl, carboxylic acids, alcohols, tin, silica, and mixtures thereof.

Amine-functionalized initiators include those that are the reaction product of an amine, an organo lithium, and a solubilizing component. The initiator may have the general formula:

$(A)Li(SOL)_y$ where y is from 1 to 3; SOL is a solubilizing component selected from the group consisting of hydrocarbons, ethers, amines or mixtures thereof; and, A is selected from the group consisting of alkyl, dialkyl and cycloalkyl amine radicals having the general formula:

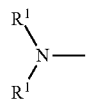

and cyclic amines having the general formula:

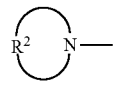

where $R^1$ is selected from the group consisting of alkyls, cycloalkyls or aralkyls having from 1 to 12 carbon atoms, and $R^2$ is selected from the group consisting of an alkylene, substituted alkylene, oxy- or N-alkylamino-alkylene group having from 3 to 16 methylene groups. A specific example of a functionalized lithium initiator is hexamethylene imine propyllithium.

Tin functionalized lithium initiators may also be useful in synthesizing the nanoparticles. Suitable tin functionalized lithium initiators include tributyl tin lithium, trioctyl tin lithium, and mixtures thereof.

Anionic initiators generally are useful in amounts ranging from about 0.01 to about 60 millimoles per hundred grams of monomer charge. Free radical initiators are useful in amounts ranging from about 6 to about 100 millimoles per hundred grams of monomer charge.

The core may range in size from 5 nanometers to about 10,000 nanometers, for example about 25 to about 1,000 nanometers, about 40 to about 150 nanometers, about 50 to about 125 nanometers, or about 100 to about 1,000 nanometers. In an embodiment, the core differs from that of a star polymer in that it does not emanate from a single point, but instead is decentralized and has a minimum size of 5 nanometers.

The core may be useful in some applications without further addition of a shell. In one embodiment, the living polymer chain ends are terminated and the crosslinked core is the nanoparticle. In another embodiment, a shell layer or layers are added to the core.

In an embodiment, a shell for the nanoparticles is formed by grafting or polymerizing a shell species onto the living ends of the cross-linked core. The nanoparticle is thus formed with polymers or copolymers extending from the cross-linked core into the uncrosslinked shell. The shell species can be selected from a variety of oligomers, polymers, monomers, or macromolecules and functionalized versions of all of these. Because the shell is formed last, the shell species does not need to be as stable as it would if it were formed first and had to survive the core formation and cross-linking process. Thus, the core-first process can produce many new nanoparticles that were difficult or impossible to make with a shell first process. In addition, the core-first dispersion process provides an easier and more reliable method to make functionalized nanoparticles in general.

In one embodiment, the shell species is a polymer that has already been polymerized in a separate reactor and then added to the reactor that holds the core with living ends. An addition of the preformed polymer to the reactor containing the core would result in the polymer chains being grafted to the cross-linked core, thereby forming a shell with polymer brushes. The term "polymer brushes" or "brush-like surface" as used herein, is used to mean the uncrosslinked polymers that extend into the shell of the nanoparticles. Like the term "hairy," the term "brushes" denotes the uncrosslinked nature of the shell. Alternatively, the preformed polymer may be functionalized with a functional initiator, a functional terminator, or both in the separate reactor and then grafted onto the living ends of the core, thereby forming functionalized polymer brushes in the shell of the nanoparticle.

In another embodiment, the shell species is added as a monomer to the reactor containing the core and polymerized with initiator in the same reactor with the core. The shell would thus comprise polymer brushes of the shell species. Optionally, functional terminators could be used to functionalize the polymer brushes of the shell.

In another embodiment, the shell species is a monomer containing a heteroatom. The heteroatomic monomer is polymerized and grafted to the core as described above.

The shorter the uncrosslinked polymer brushes are, the harder and more well-defined the nanoparticle will be. This is due to the proximity of the ends of the polymer brushes to the hard core and the thermodynamic effects of the same.

In another embodiment, the shell species is a single monomer unit. The unit may be a hydrocarbon or contain one or more heteroatoms, and it may be functionalized. The monomer is added with no initiator and bonds to the living ends of the core. This embodiment forms a nanoparticle with a single monomer unit shell.

In another embodiment, the shell species is a macromolecule having a molecular weight up to about 10,000 g/mol or an oligomer. The shell species is added to the reactor containing the core. The macromolecule or oligomer is thus grafted onto the living ends of the core. Various functional groups may be present in the macromolecule or oligomer.

In another embodiment, the shell species is itself a functional terminator. When added to the reactor containing the core, the functional terminator bonds to the living ends of the core and terminates the core with a functional group. In this example, the functional group is considered the shell.

Example shell species generally include hydrocarbons, heteroatomic species, polar functionalized species, water-soluble species, and thermoplastic and plastic elastomers.

Hydrocarbon shell species include $C_4$ to $C_8$ conjugated dienes, such as, 1,3-butadiene, isoprene, and 1,3-pentadiene. Olefinic species such as ethylene, propylene, isobutylene, and cyclohexene may also be used.

Heteroatomic shell species include species containing O, N, S, P, Cl, Ti, and Si atoms, such as, epoxides, urethanes, esters, ethers, imides, amines, carbonates, siloxanes, halogens, metals, synthetic oils, and vegetable oils. Specific examples include, polydimethylsiloxane (PDMS), polyethylene oxide (PEO), halogenated butyl rubber, polyethylene terephthalate (PET), polyethylene glycol (PEG), polyphenylene oxide (PPO), polypropylene glycol) diglycidyl ether (PPO-EO2), polyvinyl alcohol, pyridine, carbazole, imidazole, diethylamino-styrene, and pyrrolidone. Example macromolecules or oligomers include polyethylene glycol, polyphenylene oxide, and polydimethylsiloxane.

Functional terminators for use with or as the shell species include $SnCl_4$, $R_3SnCl$, $R_2SnCl_2$, $RSnCl_3$, carbodiimides, N-methylpyrrolidine, cyclic amides, cyclic ureas, isocyanates, Schiff bases, 4,4'-bis(diethylamino)benzophenone, N,N'-dimethylethyleneurea, and mixtures thereof, wherein R is selected from the group consisting of alkyls having from 1 to 20 carbon atoms, cycloalkyls having from 3 to 20 carbon atoms, aryls having from 6 to 20 carbon atoms, aralkyls having from 7 to 20 carbon atoms, and mixtures thereof.

Additionally, the shell species may include copolymers, including random and block copolymers. These copolymers may include the hydrocarbon and heteroatomic monomers listed above. The copolymer shell species may be synthesized prior to introducing the species into the reactor with the core, or it may be polymerized after introduction into the reactor as described above.

Such multi-block polymers, are believed to aggregate to form micelle-like structures around the core, with the block that is the least soluble in the solvent directed toward the center of the core and the other block as a tail or brush extending therefrom. For example, in a hydrocarbon solvent, vinyl-substituted aromatic blocks are directed toward the center of the core and other blocks extend as tails therefrom. It is noted that a further hydrocarbon solvent charge or a decrease in polymerization mixture temperature may also be used, and may in fact be required, to obtain formation of the micelles. Moreover, these steps may be used to take advantage of the general insolubility of a vinyl-aromatic block. An exemplary temperature range for micelle formation is between −80 and 100° C., such as between 20° C. and 80° C.

Although the above description discusses the formation of multi-block polymers prior to micelle formation, it is noted that after the nanoparticles have formed, additional monomer charge(s), such as conjugated diene monomer and/or vinyl-substituted aromatic hydrocarbon monomer, can be added to the polymerization mixture as desired. In this manner, multi-block polymers may be formed when only diblock polymers form the nanoparticles. Moreover, it is feasible to form the micelles of the block co-polymers with a further monomer(s) charge thereafter. The sequential addition of various monomers allows growth of particle size and formation of the shell with different internal structures.

In an alternative embodiment the shell of the nanoparticles may be formed by grafting a charge agent containing species onto the living ends of the cross-linked core or terminating the living ends with a charge agent containing terminating agent. The nanoparticle is thus formed with polymers, copolymers, or the terminating agent of the core polymers extending from the cross-linked core into the shell. The nature and quantity of the charge agent allows control of the charge on the nanoparticle.

One method of adding a charge agent to the living ends of the nanoparticle core is through the addition of a functionalized terminator. The functionalized terminator includes a charge agent that has a fixed formal charge group that exists after the addition to the nanoparticle. By fixed formal charge it is meant a charge that results from an actual excess or deficiency of electrons, not merely a localized charge due to an electron rich area of the molecule.

Once the core is formed and a desired yield is obtained, the functional terminator containing the charge agent is added to the reactor. In an embodiment, this is a one-pot process that does not require a separate isolation step or drying step to isolate and dry the core.

The added terminator terminates the living ends of the mono-vinyl polymer chains of the core and places a functional group containing the charge agent on the end of the chains. In this embodiment the functional group is considered to be the shell layer of the nanoparticle. The very thin functional group shell layer has the advantage of being physically durable and resistant to frictional shearing forces. This is due to its short length and proximity to the highly crosslinked core of the nanoparticle.

By selecting a charge agent that has a known charge, one can craft a nanoparticle with a desired charge that is physically durable and resistant to frictional shearing forces. The charge agent may be selected from a variety of charge agents that have a fixed formal charge. For most applications species with a more stable, fixed, formal charge are preferred. Examples of compounds that may have a stable, fixed, formal charge include nitrogen- and oxygen-containing species, such as cyclic compounds, including without limitation, succinic anhydride, imidazole, pyridines, N,N-dimethylaminostyrene and N,N-diethylaminostyrene, including without limitation, pyridine silane or vinyl pyridine and the derivates of all the above. Nitrogen containing species that contain quaternary ammonium compounds have a particularly stable charge. Quaternary phosphonium and quaternary sulfonium compounds are similar species with stable charges. Nitrogen containing species, such as pyridines may readily be imparted with a positive formal charge, whereas oxygen containing species, such as succinic anhydride, may readily be imparted with a negative formal charge.

A second, more versatile, method of adding a charge agent to the living ends includes polymerizing one or more monomer units having a charge agent with a fixed formal charge onto the living ends of the nanoparticle core. Once the core is formed from the core formation process discussed above and a desired yield is obtained, a monomer that includes the charge agent may be added to the reactor along with a polymerization initiator. Again, this is a one-pot process that does not require separate isolation or drying of the core. The monomer containing the charge agent bonds to the living ends of the mono-vinyl polymer chains of the core. Depending on reaction conditions, and the amount of monomer and initiator, additional monomer-contributed units will propagate in polymer chains originating from the living ends of the mono-vinyl polymer chains of the nanoparticle core. In this way, the nanoparticle comprises diblock polymer chains with a mono-vinyl block that is crosslinked and a charge agent block. The charge agent block may be considered to be the shell layer of the nanoparticle, while the cross-linked mono-vinyl block may be considered to be the core layer of the nanoparticle. Similarly, the shell block of the diblock polymers that comprise the nanoparticle include the charge agent monomers as monomer contributed units, while the core block includes the mono-vinyl monomers as monomer contributed units.

In another method adding a charge agent to the living ends of the nanoparticle core, the charge agent is a monomeric species that has already been polymerized in a separate reactor and then added to the reactor that holds the core with living ends. An addition of the preformed polymeric charge agent to the reactor containing the core would result in the polymer chains being grafted to the cross-linked core, thereby forming a shell with propagated charge agent chains.

In another method adding a charge agent to the living ends of the nanoparticle core, a charge agent monomer is added to the reactor. The monomer may be a hydrocarbon containing one or more heteroatoms, and it may be functionalized. The monomer is added with no initiator and grafts onto the living ends of the core. This method forms a nanoparticle with a shell having a single charge agent layer.

The charge of the nanoparticle can be controlled by the selection of the charge agent, and it can also be controlled by the number of charge agents present in the nanoparticle. The number of charge agents in the nanoparticle is a function of the amount of charge-agent-containing monomer and the length of the charge agent block of the polymer chains. It is also a function of the number of living ends present on the surface of the core (onto which the charge agent-containing-monomer attaches).

The nanoparticle core will have a negative charge due to the electron-rich localized charge induced by the mono-vinyl monomer contributed units and the cross-linking agent. Addition and polymerization of a shell monomer with a positive charge agent such as pyridine will cause the overall charge of the nanoparticle to be less negative, and continued addition and polymerization of the monomer will cause the charge on the nanoparticle to become positive. Conversely, addition and polymerization of a shell monomer with a negative charge agent such as succinic anhydride will cause the overall charge of the nanoparticle to be more negative. Thus, in general, the more charge agent monomer-contributed units that are present in the shell layer of the nanoparticle, and the longer each charge agent block polymer chain is, the more positive or negative the charge on the nanoparticle will become according to whether a positive or negative charge agent is used. In this manner one can select a charge agent and polymerize additional monomer units until a desired charge is reached.

A wide range of equilibrium weight-average charge values can be reached by this method. For example, the charge may range from about $-500$ µC/g to about 600 µC/g, such as about $-300$ µC/g to about 300 µC/g, or about $-150$ µC/g to about 150 µC/g. Negatively charged nanoparticles may, for example, have charges of about $-10$ µC/g or less, such as about $-50$ µC/g or less, about $-500$ µC/g to about $-50$ µC/g, or about $-150$ µC/g to about $-50$ µC/g. Positively charged nanoparticles may have charges of greater than about 0 µC/g, such as about 50 µC/g or greater, about 1 to about 600 µC/g, about 100 to about 300 µC/g, or about 300 to about 600 µC/g.

The amount (Q) of the charged nanoparticles, may range from about 1 to about 600 μC/g, such as about 1 to about 100 μC/g, or The core-first nanoparticle formation process allows the nanoparticle to include charge agent species in the shell. Because the shell is formed last, the shell species does not need to be as stable as it would if it were formed first and had to survive the core formation and cross-linking process. The hydrocarbon solvent used in previous shell-first nanoparticle formation methods also did not allow both micelle aggregation and polymerization of polar (charge agent) monomers. Thus, the core-first process can produce many new nanoparticles that were difficult or impossible to make with shell first processes.

While having long, uncrosslinked polymer chains in the shell may be beneficial in some applications, to preserve the charge and the durability of the nanoparticle, relatively short shell layer chain lengths are preferable for some applications. The longer the shell layer chain lengths become, the more susceptible they are to frictional shear forces and degradation. Accordingly, a relatively thin shell layer is preferable for some applications, such as for electronic displays. For example, the shell layer may be about 1 nm to about 100 nm, such as about 1 nm to about 50 nm, or about 1 nm to about 25 nm.

For certain applications such as QR-LPD display technologies, making both positively and negatively charged nanoparticles to be used in cells together is required. The methods and nanoparticles described herein are particularly well suited to controlling the polarity and the magnitude of a group of positive and negative particles. In an embodiment, a first group of nanoparticles and a second group of nanoparticles may have a difference in charge of about 50 μC/g or greater, such as about 50 to about 500 μC/g, or about 75 to about 200 μC/g.

The size of the entire core-shell nanoparticles, including both core and shell—expressed as a mean average diameter—are, for example, between about 5 and about 20,000 nanometers, such as about 50 to about 5,000 nanometers, about 75 to about 300 nanometers, or about 75 to about 150 nanometers.

For some applications the nanoparticles are preferably substantially monodisperse and uniform in shape. The nanoparticles may, for example, have a dispersity less than about 1.3, such as less than about 1.2, or less than about 1.1. Image analysis, such as SEM image analysis, or light scattering analysis of the particles can provide information for calculating the particle size distribution.

The highly cross-linked nature of the nanoparticles described herein enables them to have a highly spherical shape with few if any shape defects or irregularities. In one embodiment, about 90% to 100%, for example, about 92% to about 99%, or about 95% to about 98%, of the nanoparticles have no shape defects or irregularities. Furthermore, the sphericalness of the nanoparticles can be measured by measuring a first diameter ($D_1$) of a nanoparticle and then a second diameter ($D_2$) at a right angle to $D_1$. ($D_1$ may be selected to be any diameter of the nanoparticle, and the measurements of $D_1$ and $D_2$ may be done by analysis of an SEM image.) Then dividing $D_1$ by $D_2$ will yield a number close to 1, for example about 0.9 to about 1.1, 0.95 to 1.05, or 0.97 to 1.03. Thus, a formula representing the sphericalness (s) of the nanoparticles may be stated as: $D_1/D_2=s$. In one embodiment, about 90% to 100%, for example, about 92% to about 99%, or about 95% to about 98%, of the nanoparticles have a sphericalness of about 0.9 to about 1.1.

Without being bound by theory, it is believed that nanoparticles that are highly spherical will be more durable in structural and charge characteristics than those that are not so spherical. This is due, in part, to the decreased frictional forces that act upon objects that are highly spherical. Shape defects are likely to cause structural failure or deformation of the nanoparticles.

In an embodiment the example nanoparticles are also substantially discrete, for example, the nanoparticles have about 20% to 0% cross-linking between nanoparticles, such as 9% to 0%, about 8% to about 2%, about 5% to about 0.1%, or about 3% to about 0.1%.

In an embodiment, the core of the synthesized nanoparticles is hard. For example, the core has a Tg of 100° C. or higher, such as 150° C. or higher. In an embodiment, the nanoparticles have a core that is relatively harder than the shell, for example, at least 60° C. higher than the Tg of the shell layer, or at least 1° C. higher than the Tg of the shell layer. In one example, the shell layer is soft. That is, the shell layer has a Tg lower than 0° C. In one embodiment, the Tg of the shell layer is between 0° C. and −100° C. In another embodiment the Tg of the shell is also high, such as 100° C. or higher, such as 150° C. or higher. Nanoparticles with hard cores and soft shells are particularly useful for reinforcing rubber compounds used for tire treads. Nanoparticles with hard cores and hard shells are particularly useful in electronic display applications such as QR-LPD.

The Tg of the polymers in the nanoparticles is influenced by the selection of monomers and their molecular weight, styrene content, and vinyl content. The degree of cross-linking also contributes to the Tg of the core and shell.

The following examples and tables are presented for purposes of illustration only and are not to be construed in a limiting sense.

EXAMPLES

A 0.8 liter nitrogen-purged glass bottle sealed with a septum liner and perforated crown cap was used as the reactor vessel for the examples below. Styrene (33 wt % in hexane), hexane, n-butyllithium (1.60 M in hexane), 2,2-bis(2'-tetrahydrofuryl)propane (1.60 M in hexane, stored over calcium hydride), potassium tert-amyloxide (KTA), and BHT solution in hexane were also used. PS-PB diblocks STEREON S730AC and STEREON S721 were obtained from Firestone Polymers. Commercially available reagents were obtained from Aldrich and Gelest Inc. (Morrisville, Pa.) and dried over molecular sieves (3 Å).

Examples A-D

Examples A-D were made by the method below. The only difference between examples A-D is the amount of DVB that was added.

To a 0.8 liter nitrogen-purged glass bottle was added 140 g of hexane, 60 g of 33 wt % styrene, varying amounts of DVB, 6 ml of 5 wt % STEREON S721, 0.4 ml of 1.6 M 2,2'-di(tetrahydrofuryl)propane (OOPS), and 2 ml of 1.6 M n-butyl lithium. The amount of DVB was added in the amounts shown in FIG. 1. The DVB % shown in FIG. 1 is a weight percent based on the total amount of DVB and monomer. The reaction mixture was stirred for one day at room temperature before terminating with 3 ml isopropanol. After the solvent evaporated, the products were dried in vacuum.

FIG. 1 graphically shows the yield of nanoparticles obtained compared to the varying amounts of DVB. The DVB was added all at once, and a single solvent system (hexane)

was used. This data demonstrates that simply increasing the amount of DVB causes reduced yields.

Example 1

To a 0.8 liter nitrogen-purged glass bottle was added 140 g of hexane, 60 g of 33 wt % styrene, 10 ml of DVB, 6 ml of 5 wt % STEREON S721, 0.4 ml of 1.6 M 2,2'-di(tetrahydrofuryl)propane (OOPS), and 2 ml of 1.6 M n-butyl lithium. The reaction mixture was stirred for one day at room temperature before terminating with 3 ml isopropanol. After the solvent evaporated, the products were dried in vacuum.

Example 2

To a 0.8 liter nitrogen-purged glass bottle was added 300 g of hexane, 20 g of 33 wt % styrene, 0.1 ml of DVB, 1 ml of 5 wt % STEREON S721, 0.2 ml of 1.6 M 2,2'-di(tetrahydrofuryl)propane (OOPS), and 1 ml of 1.6 M n-butyl lithium. After 10 minutes, an additional 2.8 ml of DVB was added to the bottle. The reaction mixture was stirred for one day at room temperature before terminating with 3 ml of isopropanol. After the solvent evaporated, the products were dried in vacuum.

Example 3

To a 0.8 liter nitrogen-purged glass bottle was added 300 g of hexane, 20 g of 33 wt % styrene, 30 ml of THF, 0.3 ml of DVB, 1 ml of 5 wt % STEREON S721, 0.2 ml of 1.6 M 2,2'-di(tetrahydrofuryl)propane (OOPS), and 1 ml of 1.6 M n-butyl lithium. After 10 minutes, an additional 2.6 ml of DVB was added to the bottle. The reaction mixture was stirred for one day at room temperature before terminating with 3 ml of isopropanol. After the solvent evaporated, the products were dried in vacuum.

Example 4

To a 0.8 liter nitrogen-purged glass bottle was added 300 g of hexane, 20 g of 33 wt % styrene, 0.5 ml of DVB (50 wt % in hexane), 10 ml of 5 wt % STEREON S730AC, 0.06 ml of 1.6 M KTA and 0.5 ml of 1.6 M n-butyl lithium. After 10 minutes, an additional 9.5 ml of DVB (50 wt % in hexane) was added to the bottle. The reaction mixture was stirred for three days at room temperature. The products were coagulated with isopropanol, filtered, and dried in vacuum.

Example 5

To a 0.8 liter nitrogen-purged glass bottle was added 300 g of hexane, 20 g of 33 wt % styrene, 10 ml of THF, 0.5 ml of DVB (50 wt % in hexane), 10 ml of 5 wt % STEREON S730AC, 0.06 ml of 1.6 M KTA and 0.5 ml of 1.6 M n-butyl lithium. After 10 min, an additional 9.5 ml of DVB (50 wt % in hexane) was added to the bottle. The reaction mixture was stirred for three days at room temperature. The products were coagulated with isopropanol, filtered, and dried in vacuum.

Example 6

To a 0.8 liter nitrogen-purged glass bottle was added 300 g hexane, 20 g of 33 wt % styrene, 20 ml of THF, 0.5 ml of DVB (50 wt % in hexane), 10 ml of 5 wt % STEREON S730AC, 0.06 ml of 1.6 M KTA, and 0.5 ml of 1.6 M n-butyl lithium. After 10 min, an additional 9.5 ml DVB (50 wt % in hexane) was added to the bottle. The reaction mixture was stirred for three days at room temperature. The products were coagulated with isopropanol, filtered, and dried in vacuum.

TABLE 1

Figure 2:
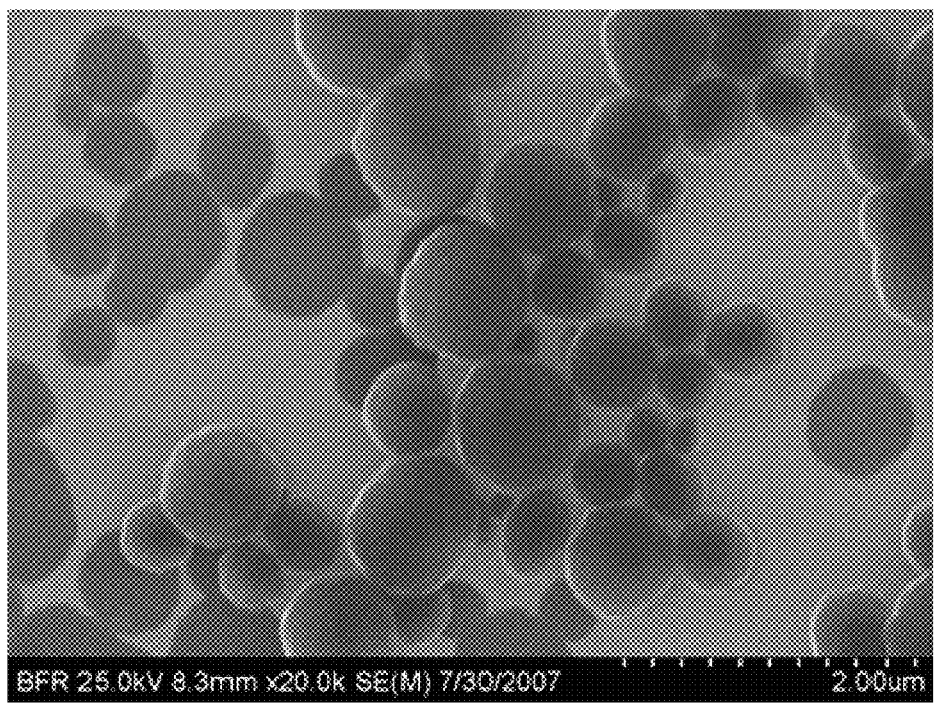
FIG. 2 is an SEM image of a collection of nanoparticles according to Example 1.
Figure 3:
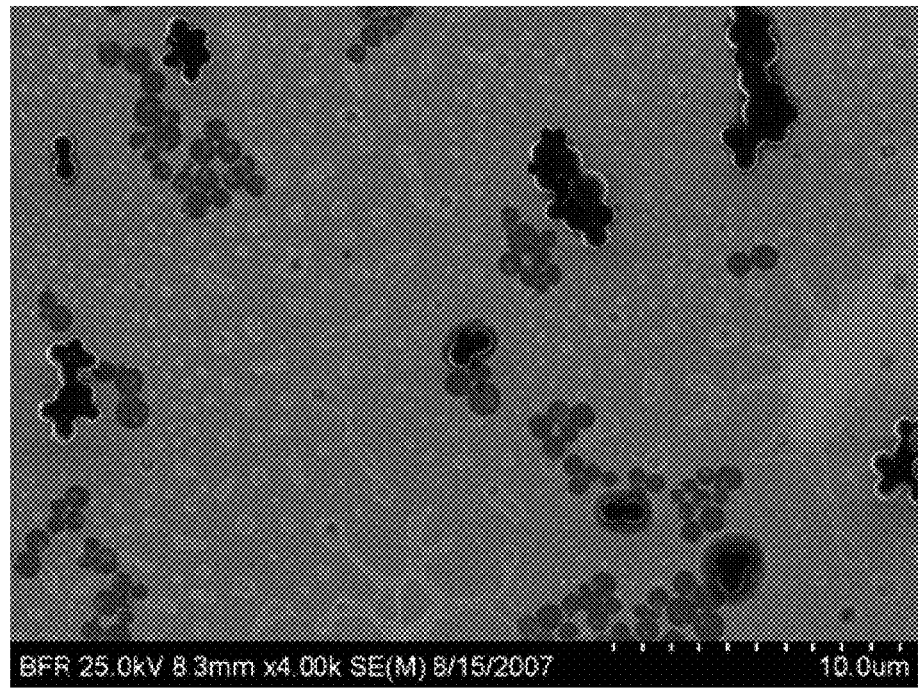
FIG. 3 is an SEM image of a collection of nanoparticles according to Example 2.
Figure 4:
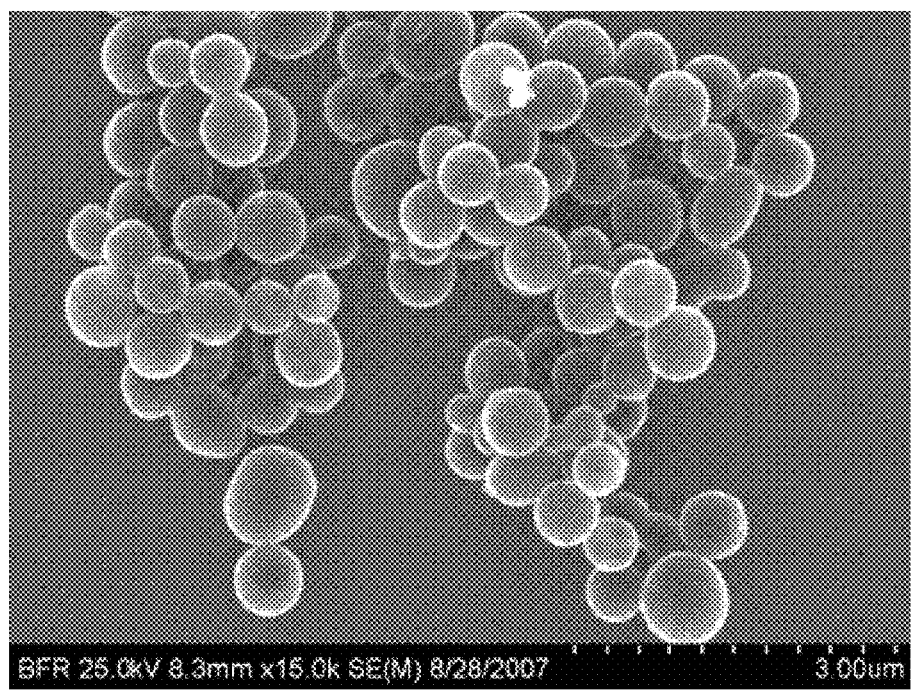
FIG. 4 is an SEM image of a collection of nanoparticles according to Example 3.

|  | Example 1 | Example 2 | Example 3 |
|---|---|---|---|
| St/DVB (wt/wt) | 68/32 | 72/28 | 72/28 |
| THF/Hexane (vol/vol) | 0 | 0 | 6% |
| $1^{st}/2^{nd}$ DVB charge | 10/0 ml | 0.1/2.8 ml | 0.3/2.6 ml |
| Yield (%) | 42 | 87 | 98 |
| Size (nm) | 500-1000 | 500-800 | 400-600 |
| SEM image | FIG. 2 | FIG. 3 | FIG. 4 |

TABLE 2

Figure 5:
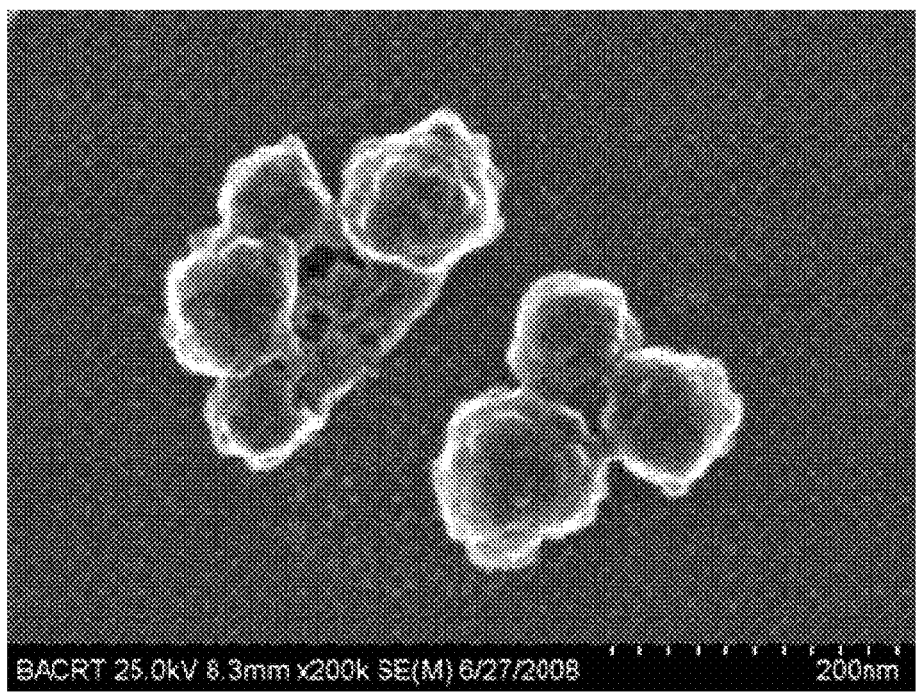
FIG. 5 is an SEM image of a collection of nanoparticles according to Example 4.
Figure 6:
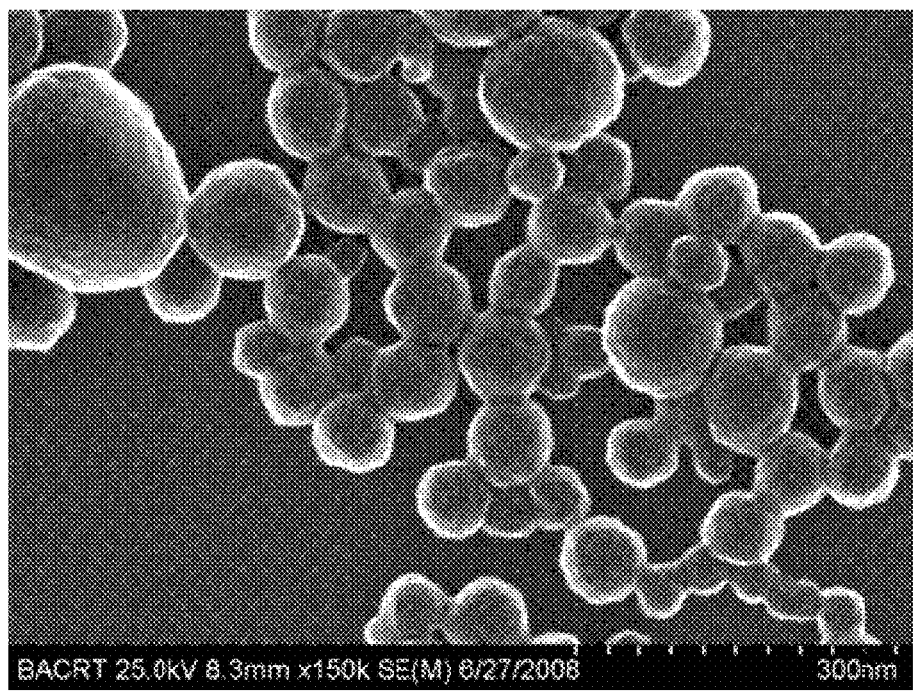
FIG. 6 is an SEM image of a collection of nanoparticles according to Example 5.
Figure 7:
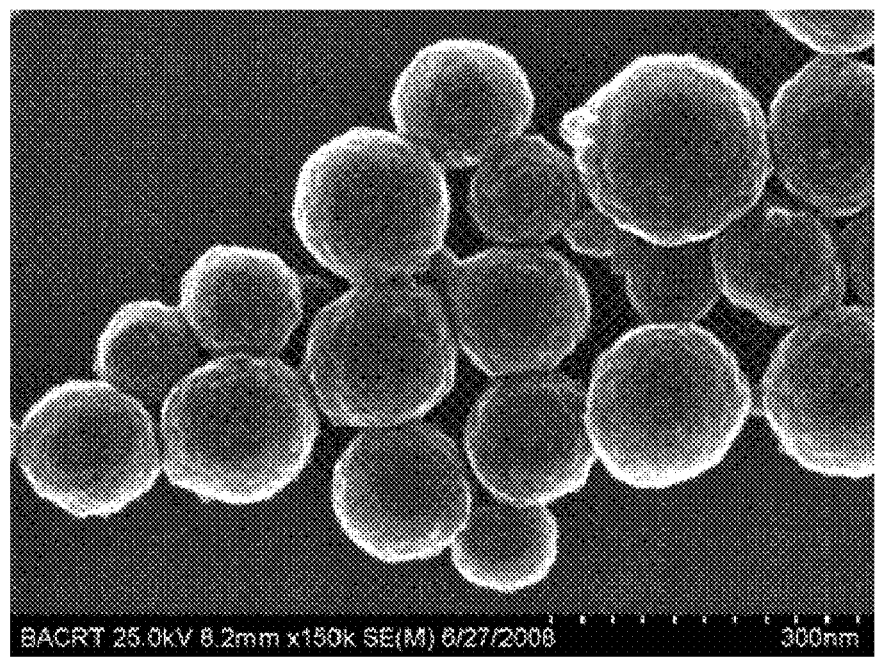
FIG. 7 is an SEM image of a collection of nanoparticles according to Example 6.

|  | Example 4 | Example 5 | Example 6 |
|---|---|---|---|
| St/DVB (wt/wt) | 57/43 | 57/43 | 57/43 |
| THF/Hexane (vol/vol) | 0 | 2% | 4% |
| $1^{st}/2^{nd}$ DVB charge | 0.25/4.75 ml | 0.25/4.75 ml | 0.25/4.75 ml |
| Yield (%) | 32 | 53 | 70 |
| Size (nm) | 80-120 | 50-140 | 80-100 |
| SEM image | FIG. 5 | FIG. 6 | FIG. 7 |

The complex nature of the core-first dispersion polymerization process makes it difficult to reproducibly control the particle shape uniformity and size distribution. Increased content of styrene and DVB (crosslinking agent) in the anionic dispersion polymerization reduced the product yield and led to a gel. Table 1 shows the effect on the product yield of varying the DVB amount. In Examples 2-6 DVB was incrementally added to the bottle to prevent aggregation of highly crosslinked nanoparticles. The Examples show the effect of THF as a modifier and co-solvent as well. The results are summarized in Tables 1 and 2.

Incremental DVB addition increased not only the product yield but also improved the particle shape and size distribution. THF as a modifier and co-solvent accelerated the polymer chain propagation in the heterogeneous polymerization and activated the live ends of the core to swell and incorporate more monomer and cross-linking agent.

Furthermore, well-defined particles with high crosslinking density were obtained by balancing initiation, propagation, and particle formation in the presence of THF and the modifier such as OOPS or KTA.

This written description sets forth the best mode of the invention, and describes the invention so as to enable a person skilled in the art to make and use the invention, by presenting examples. The patentable scope of the invention is defined by the claims, and may include other examples that occur to those skilled in the art.

It is claimed:

1. A method for making nanoparticles, comprising the steps of:
   combining a hydrocarbon solvent and an aprotic, polar co-solvent, a mono-vinyl aromatic monomer, polymerization initiator, a solution stabilizer, and a first charge of a cross-linking agent;
   adding a second charge of the cross-linking agent or a charge of another cross-linking agent;
   wherein the nanoparticles have an average diameter of 5 nanometers to about 10,000 nanometers;
   wherein a volume ratio of hydrocarbon solvent to aprotic, polar co-solvent ranges from about 99.9:0.1 to about 70:30.

2. The method of claim 1, wherein a surface of the nanoparticles have polymer chains with living ends.

3. The method of claim 1, wherein the aprotic, polar co-solvent is selected from THF, 2-methyl THF, diethyl ether, dioxane, dimethyl sulfoxide, dimethylformamide, and hexamethylphosphorotriamide.

4. The method of claim 1, wherein the first charge of cross-linking agent is about 1 to about 50% by weight of the second charge of the cross-linking agent or a charge of another cross-linking agent.

5. The method of claim 1, wherein the second charge is added after about 51% to 100% monomer conversion.

6. The method of claim 1, further comprising adding a modifier.

7. The method of claim 2, further comprising adding a charge agent comprising a fixed formal positive charge group onto the living ends of the surface to form a shell layer.

8. The method of claim 2, further comprising adding an additional monomer onto the living ends of the surface to form a shell layer.

9. The method of claim 5, wherein the second charge is added after about 90% to about 100% conversion.

10. The method of claim 1, wherein a volume ratio of hydrocarbon solvent to aprotic, polar co-solvent ranges from about 85:15 to about 95:5.

11. The method of claim 1, wherein the solvent is selected from the group consisting of: pentane, hexane, heptane, octane, nonane, decane, cyclohexane, methyl cyclopentane, cyclooctane, cyclopentane, cycloheptane, cyclononane, and cyclodecane.

12. The method of claim 1, wherein the mono-vinyl aromatic monomer is soluble in the solvent, but after polymerization, is insoluble in the solvent.

13. The method of claim 1, wherein the first and/or second charge of cross-linking agent is metered.

14. The method of claim 1, wherein the nanoparticles meet the following equation: $0.90 \leq (D1/D2) \leq 1.1$ wherein D1 is a first diameter of a nanoparticle and D2 is a second diameter of the nanoparticle, and D1 and D2 intersect at right angles.

15. The method of claim 2, further comprising the step of adding a functional terminator to terminate the living ends.

16. The method of claim 1, with the proviso that emulsion polymerization is not used to make the nanoparticles.

17. The method of claim 1, wherein the yield of nanoparticles is about 80% to about 100%.

18. A core-first method for making core-shell nanoparticles, comprising the steps of:
combining a hydrocarbon solvent and an aprotic, polar co-solvent, a mono-vinyl aromatic monomer, polymerization initiator, a solution stabilizer, and a first charge of a cross-linking agent and adding a second charge of the cross-linking agent or a charge of another cross-linking agent, thereby forming a core with a surface comprising living ends;
subsequently adding a shell species to the living ends;
wherein the nanoparticles have an average diameter of 5 nanometers to about 10,000 nanometers.

19. The method of claim 18, wherein the shell species comprises a charge agent comprising a fixed formal positive charge group.

20. The method of claim 18, wherein the nanoparticles meet the following equation: $0.90 \leq (D1/D2) \leq 1.1$ wherein D1 is a first diameter of a nanoparticle and D2 is a second diameter of the nanoparticle, and D1 and D2 intersect at right angles.

21. A method for making core-shell nanoparticles, comprising the steps of:
combining a hydrocarbon solvent and an aprotic, polar co-solvent, a mono-vinyl aromatic monomer, polymerization initiator, and a first charge of a cross-linking agent, adding a second charge of the cross-linking agent or a charge of another cross-linking agent, thereby forming the core, the core having a surface;
stabilizing the surface of the core in solution with a solution stabilizer, the solution stabilizer adsorbing on the surface of the core;
wherein the nanoparticles have an average diameter of 5 nanometers to about 10,000 nanometers.

22. The method of claim 21, wherein the nanoparticles meet the following equation: $0.90 \leq (D1/D2) \leq 1.1$ wherein D1 is a first diameter of a nanoparticle and D2 is a second diameter of the nanoparticle, and D1 and D2 intersect at right angles.

23. The method of claim 21, wherein the surface of the core comprises living ends of polymer chains.

* * * * *